(12) United States Patent
Murase et al.

(10) Patent No.: US 11,797,463 B2
(45) Date of Patent: Oct. 24, 2023

(54) SIGNAL GENERATION DEVICE

(71) Applicant: Nidec Corporation, Kyoto (JP)

(72) Inventors: Shuhei Murase, Kyoto (JP); Tomohisa Tokunaga, Kyoto (JP); Daisuke Mizunuma, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 111 days.

(21) Appl. No.: 17/560,481

(22) Filed: Dec. 23, 2021

(65) Prior Publication Data

US 2022/0206974 A1 Jun. 30, 2022

(30) Foreign Application Priority Data

Dec. 25, 2020 (JP) .................. 2020-216357
Sep. 30, 2021 (JP) .................. 2021-160449

(51) Int. Cl.
*G06F 13/24* (2006.01)
*G06F 1/10* (2006.01)
*G06F 1/14* (2006.01)

(52) U.S. Cl.
CPC ............. *G06F 13/24* (2013.01); *G06F 1/10* (2013.01); *G06F 1/14* (2013.01)

(58) Field of Classification Search
CPC .............. G06F 13/24; G06F 1/10; G06F 1/14
See application file for complete search history.

(56) References Cited

U.S. PATENT DOCUMENTS

| | | | | |
|---|---|---|---|---|
| 6,169,765 B1 * | 1/2001 | Holcombe | ........... | H03K 5/1565 329/312 |
| 6,633,620 B2 * | 10/2003 | Taguchi | .............. | B60C 23/0462 375/360 |
| 7,350,095 B2 * | 3/2008 | Boerstler | .................. | G06F 1/10 713/400 |
| 7,786,777 B2 * | 8/2010 | Denier | ................. | H03K 5/1565 327/167 |
| 8,032,850 B2 * | 10/2011 | Boerstler | ............ | G06F 30/3312 716/132 |
| 8,660,172 B2 * | 2/2014 | Yoshida | ............ | H04L 25/03834 375/360 |
| 9,748,879 B2 * | 8/2017 | Kaidu | ........................ | H02P 6/34 |
| 2008/0317174 A1 * | 12/2008 | Karaki | ................. | H04B 1/7183 375/343 |

* cited by examiner

*Primary Examiner* — Henry Tsai
*Assistant Examiner* — Christopher A Daley
(74) *Attorney, Agent, or Firm* — KEATING & BENNETT

(57) ABSTRACT

A signal generation device includes a first timer to output an interrupt signal at a predetermined cycle, a second timer to output a first pulse signal and a second pulse signal, a third timer to count a number of edges of the first pulse signal and the second pulse signal, and a processor configured or programmed to perform interrupt processing to control an output mode of the second timer every time the interrupt signal occurs. When the interrupt frequency is equal to an initial value at the start of the interrupt processing, the processor is configured or programmed to perform predetermined short-period processing after performing predetermined long-period processing. When the interrupt frequency is not equal to the initial value, the processor is configured or programmed to perform the short-period processing without performing the long-period processing. The processor execute is configured or programmed to angle acquisition processing and function calculation processing as the long-period processing.

11 Claims, 13 Drawing Sheets

SIGNAL GENERATION DEVICE

CROSS-REFERENCE TO RELATED APPLICATIONS

The present invention claims priority under 35 U.S.C. § 119 to Japanese Patent Application No. 2020-216357, filed on Dec. 25, 2020, and Japanese Patent Application No. 2021-160449, filed on Sep. 30, 2021, the entire contents of which are hereby incorporated herein by reference.

1. FIELD OF THE INVENTION

The present disclosure relates to a signal generation device.

2. BACKGROUND

A general incremental rotary encoder outputs two-phase pulse signals (A-phase pulse signal and B-phase pulse signal) having a phase difference of 90° in accordance with a rotation angle of a rotating body. For example, there is conventionally known a rotation detection device that calculates a rotation angle of a rotating body based on an output signal of a magnetic sensor and generates an A-phase pulse signal and a B-phase pulse signal based on a calculation result of the rotation angle.

In the conventional rotation detection device, software and hardware necessary for generating the A-phase pulse signal and the B-phase pulse signal become complicated. As a result, the processing load of the processor that executes the software increases, and the cost of the hardware also increases, so that an expensive and high-spec dedicated chip is required to achieve the conventional rotation detection device.

SUMMARY

One example embodiment of a signal generation device of the present disclosure includes a first timer to output an interrupt signal at a predetermined cycle, a second timer to output a first pulse signal and a second pulse signal that have a predetermined phase difference, a third timer to count the number of edges of the first pulse signal and the second pulse signal, and a processor configured or programmed to perform interrupt processing to control an output mode of the second timer every time the interrupt signal occurs.

The processor is configured or programmed to perform predetermined short-period processing after performing predetermined long-period processing when the interrupt frequency, which is a number of times of occurrence of the interrupt signal, is equal to an initial value at a start of the interrupt processing, and performs the short-period processing without performing the long-period processing when the interrupt frequency is not equal to the initial value.

The processor is configured or programmed to execute, as the long-period processing, angle update processing to update absolute angle information indicating an absolute angle of a rotating body, and function calculation processing to calculate an absolute angle function expressing, as a linear function of time, the absolute angle indicated by the updated absolute angle information.

The processor is configured or programmed to execute, as the short-period processing, angle estimation value calculation processing to calculate an estimation value of the absolute angle as an angle estimation value based on the absolute angle function calculated by the function calculation processing, count value acquisition processing to acquire a count value of the number of edges from the third timer, angle current value calculation processing to calculate a current value of the absolute angle as an angle current value based on the count value, signal state value calculation processing to calculate a signal state value representing a relationship between a level of the first pulse signal and a level of the second pulse signal based on the count value, timing determination processing to determine whether or not it is a timing to change the output mode of the second timer based on the angle estimation value and the angle current value, first output mode switching processing to change the output mode of one pulse signal of the first pulse signal and the second pulse signal to one of a high-level output mode and a low-level output mode based on the signal state value, when it is determined that it is a timing to change the output mode in the timing determination processing, interrupt frequency update processing to update the interrupt frequency, and interrupt frequency reset processing to reset the interrupt frequency to the initial value when the interrupt frequency that has been updated is equal to a predetermined first threshold.

The above and other elements, features, steps, characteristics and advantages of the present disclosure will become more apparent from the following detailed description of the example embodiments with reference to the attached drawings.

DETAILED DESCRIPTION

Example embodiments of the present disclosure will be described in detail below with reference to the drawings.

Figure 1:
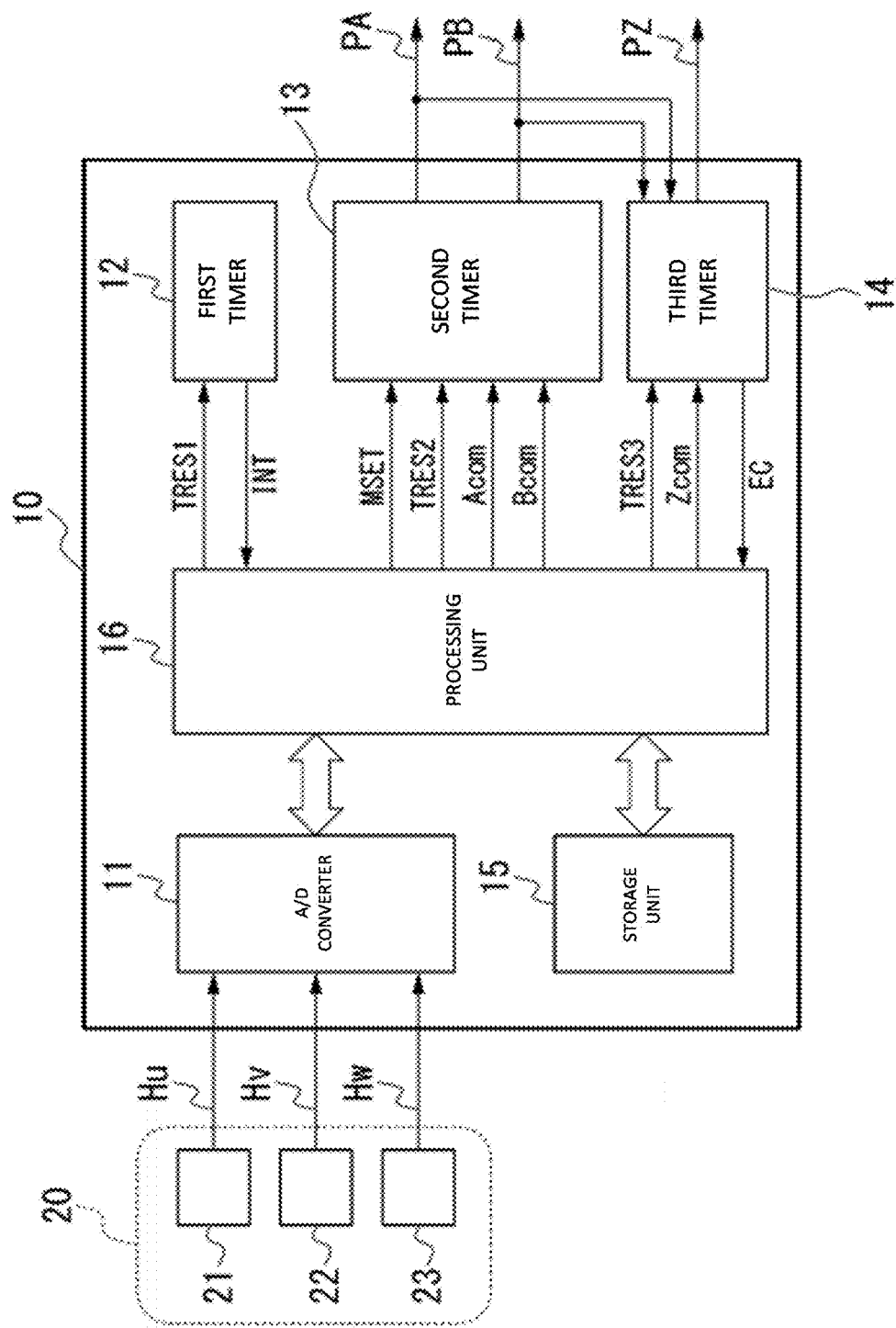
FIG. 1 is a block diagram schematically showing a configuration of a signal generation device according to a first example embodiment of the present disclosure.

FIG. 1 is a block diagram schematically showing the configuration of a signal generation device 10 according to the first example embodiment of the present disclosure. As shown in FIG. 1, the signal generation device 10 in the first example embodiment includes an A/D converter 11, a first timer 12, a second timer 13, a third timer 14, a storage unit 15, and a processor 16. The signal generation device 10 is electrically connected to a sensor unit 20. The sensor unit 20 includes three magnetic sensors 21, 22, and 23. Each of the magnetic sensors 21, 22, and 23 is a Hall sensor that detects magnetic flux intensity changing in accordance with a rotation angle of the rotating body and outputs, as a magnetic flux detection signal, an analog signal indicating a detection result of the magnetic flux intensity.

In the present example embodiment, the rotating body is, for example, a rotor of a three-phase brushless DC motor. The three-phase brushless DC motor is mounted with a control board that supplies a drive current to a three-phase coil. The magnetic sensors 21, 22, and 23 are disposed on the control board in a state of facing a rotor magnet in the axial direction of the rotor. When viewed from the axial direction of the rotor, the magnetic sensors 21, 22, and 23 are disposed on the control board at a regular interval along the rotation direction of the rotor. The regular interval is, for example, an interval of 120°.

The magnetic sensor 21 outputs a magnetic flux detection signal Hu indicating a detection result of the magnetic flux intensity in the U-phase. The magnetic sensor 22 outputs a magnetic flux detection signal Hv indicating a detection result of the magnetic flux intensity in the V-phase. The magnetic sensor 23 outputs a magnetic flux detection signal Hw indicating a detection result of the magnetic flux intensity in the W-phase. The three magnetic flux detection signals Hu, Hv, and Hw have a phase difference of 120° in electrical angle with one another.

The signal generation device 10 is, for example, a microprocessor such as a microcontroller unit (MCU) disposed on the control board. Based on the magnetic flux detection signals Hu, Hv, and Hw output from the sensor unit 20, the signal generation device 10 calculates an absolute angle θ of the rotor and, based on a calculation result of the absolute angle θ, generates a first pulse signal and a second pulse signal that have a predetermined phase difference. In the present example embodiment, the predetermined phase difference is 90°, for example. Hereinafter, the first pulse signal is referred to as an A-phase pulse signal PA, and the second pulse signal is referred to as a B-phase pulse signal PB. The signal generation device 10 generates an origin pulse signal indicating an origin of the absolute angle θ. Hereinafter, the origin pulse signal is referred to as a Z-phase pulse signal PZ.

The magnetic flux detection signals Hu, Hv, and Hw output from the sensor unit 20 are input to the A/D converter 11 of the signal generation device 10. The A/D converter 11 converts each of the magnetic flux detection signals Hu, Hv, and Hw into digital data by sampling them at a predetermined sampling frequency, and outputs the digital data of the magnetic flux detection signals Hu, Hv, and Hw to the processor 16.

The first timer 12 outputs the interrupt signal INT to the processor 16 at a predetermined cycle. Specifically, the first timer 12 increments a timer count value in synchronization with a clock signal not illustrated, and, when the timer count value reaches a timer reset value TRES1, outputs an interrupt signal INT and resets the timer count value. In this manner, the cycle at which the interrupt signal INT is output from the first timer 12 is determined by the timer reset value TRES1. The timer reset value TRES1 is set in the first timer 12 by the processor 16.

The second timer 13 outputs the A-phase pulse signal PA and the B-phase pulse signal PB having the phase difference of 90°. The second timer 13 has a high-level output mode, a low-level output mode, and a comparison output mode as output modes of the A-phase pulse signal PA and the B-phase pulse signal PB. When the output mode of the A-phase pulse signal PA is the high-level output mode, the second timer 13 sets the level of the A-phase pulse signal PA to the high level. When the output mode of the A-phase pulse signal PA is the low-level output mode, the second timer 13 sets the level of the A-phase pulse signal PA to the low level. The same applies to the B-phase pulse signal PB.

On the other hand, when the output mode is the comparison output mode, the second timer 13 increments the timer count value in synchronization with a clock signal not illustrated, and resets the timer count value every time the timer count value reaches a timer reset value TRES2. When the output mode is the comparison output mode, the second timer 13 inverts the level of the A-phase pulse signal PA every time the timer count value reaches a first level inversion threshold Acom, and inverts the level of the B-phase pulse signal PB every time the timer count value reaches a second level inversion threshold Bcom.

The output mode of the second timer 13 is switched by an output mode setting signal MSET output from the processor 16 to the second timer 13. The timer reset value TRES2, the first level inversion threshold Acom, and the second level inversion threshold Bcom are set in the second timer 13 by the processor 16. The A-phase pulse signal PA and the B-phase pulse signal PB output from the second timer 13 are input to the third timer 14.

The third timer 14 counts the number of edges of the A-phase pulse signal PA and the B-phase pulse signal PB output from the second timer 13. The third timer 14 resets the count value of the number of edges when the count value of the number of edges reaches a predetermined timer reset value TRES3. Hereinafter, the count value of the number of edges is referred to as an edge count value EC. The third timer 14 compares the edge count value EC with a predetermined Z-phase output threshold Zcom (third threshold), and outputs, as the Z-phase pulse signal PZ indicating the origin of the absolute angle θ, a signal that becomes a high level when the edge count value EC is smaller than the Z-phase output threshold Zcom. The timer reset value TRES3 and the Z-phase output threshold Zcom are set in the third timer 14 by the processor 16. The third timer 14 outputs the edge count value EC to the processor 16.

The storage unit 15 includes a nonvolatile memory that stores, in advance, a program, a setting value, and the like necessary for causing the processor 16 to execute various processing, and a volatile memory used as a temporary storage destination of data when the processor 16 executes various processing. The nonvolatile memory is, for example, an electrically erasable programmable read-only memory (EEPROM), a flash memory, or the like. The volatile memory is, for example, a random access memory (RAM), a register, or the like. The nonvolatile memory stores, as setting values, the timer reset value TRES1 of the first timer 12, the timer reset value TRES3 of the third timer 14, a Z-phase output threshold Zcom, and the like. Although details will be described later, the timer reset value TRES2 of the second timer 13, the first level inversion threshold Acom, and the second level inversion threshold Bcom are calculated by the processor 16.

The processor 16 is a processor core that executes various processing in accordance with a program stored in the storage unit 15. The processor 16 executes angle calculation processing of calculating the absolute angle θ of the rotor based on the digital data of the magnetic flux detection signals Hu, Hv, and Hw input from the A/D converter 11. The processor 16 performs interrupt processing of controlling the output mode of the second timer 13 every time the interrupt signal INT occurs. The processor 16 controls the output mode of the second timer 13 based on the absolute angle θ, whereby the A-phase pulse signal PA and the B-phase pulse signal PB having a phase difference of 90° are output from the second timer 13. When the A-phase pulse signal PA and the B-phase pulse signal PB are output from the second timer 13, the Z-phase pulse signal PZ is automatically output from the third timer 14.

Figure 2:
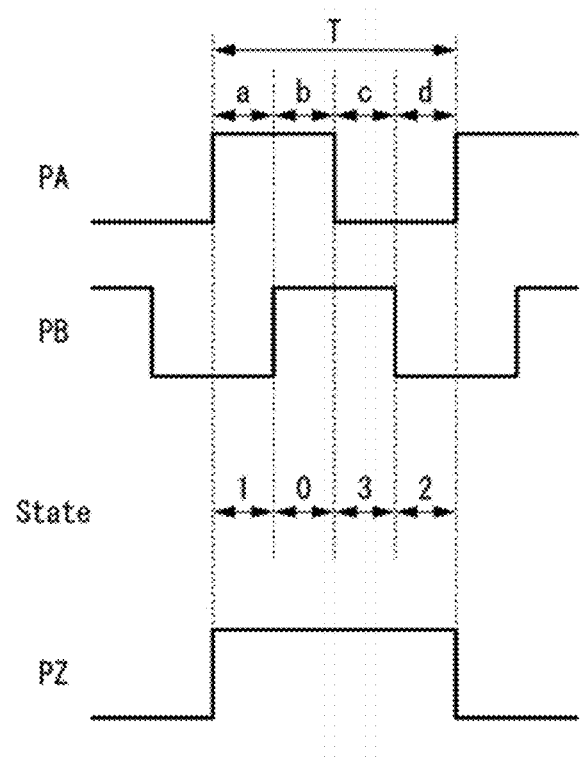
FIG. 2 is a view showing an example of a relationship among a waveform of an A-phase pulse signal, a waveform of a B-phase pulse signal, a waveform of a Z-phase pulse signal, and a signal state value.

FIG. 2 is a view showing an example of the relationship among the waveform of the A-phase pulse signal PA, the waveform of the B-phase pulse signal PB, the waveform of the Z-phase pulse signal PZ, and a signal state value State. In FIG. 2, when the cycle of the A-phase pulse signal PA is "T", the lengths of "a", "b", "c", and "d" are each T/4. As shown in FIG. 2, the B-phase pulse signal PB has a delay time of T/4 with respect to the A-phase pulse signal PA. Thus, there is a phase difference of 90° between the A-phase pulse signal PA and the B-phase pulse signal PB. The rising edge of the Z-phase pulse signal PZ occurs in synchronization with the rising edge of the A-phase pulse signal PA. The pulse width of the Z-phase pulse signal PZ can be adjusted to an arbitrary value by the Z-phase output threshold Zcom.

Note that, although details will be described later, the signal state value State shown in FIG. 2 is a value calculated by the processor 16 based on the edge count value EC in the above-described interrupt processing. The signal state value State represents the relationship between the level of the A-phase pulse signal PA and the level of the B-phase pulse signal PB. For example, when the signal state value State is "0", the signal state value State represents a state in which both the A-phase pulse signal PA and the B-phase pulse signal PB are at a high level. When the signal state value State is "1", the signal state value State represents a state in which the A-phase pulse signal PA is at a high level and the B-phase pulse signal PB is at a low level. When the signal state value State is "2", the signal state value State represents a state in which both the A-phase pulse signal PA and the B-phase pulse signal PB are at a low level. When the signal state value State is "3", the signal state value State represents a state in which the A-phase pulse signal PA is at a low level and the B-phase pulse signal PB is at a high level.

Hereinafter, the operation of the signal generation device 10 configured as described above will be described with reference to FIGS. 3 to 8.

When the signal generation device 10 is switched from a power-off state to a power-on state, the processor 16 executes predetermined initialization processing. As one of the initialization processing, the processor 16 reads the timer reset value TRES1 of the first timer 12 from the storage unit 15, and sets the read timer reset value TRES1 in the first timer 12. As one of the initialization processing, the processor 16 reads the timer reset value TRES3 of the third timer 14 and the Z-phase output threshold Zcom from the storage unit 15, and sets, in the third timer 14, the timer reset value TRES3 and the Z-phase output threshold Zcom that have been read. Furthermore, as one initialization processing, the processor 16 sets the edge count value of the third timer 14 to an initial value in accordance with the absolute angle θ, and details of this setting processing will be described later.

Figure 3:
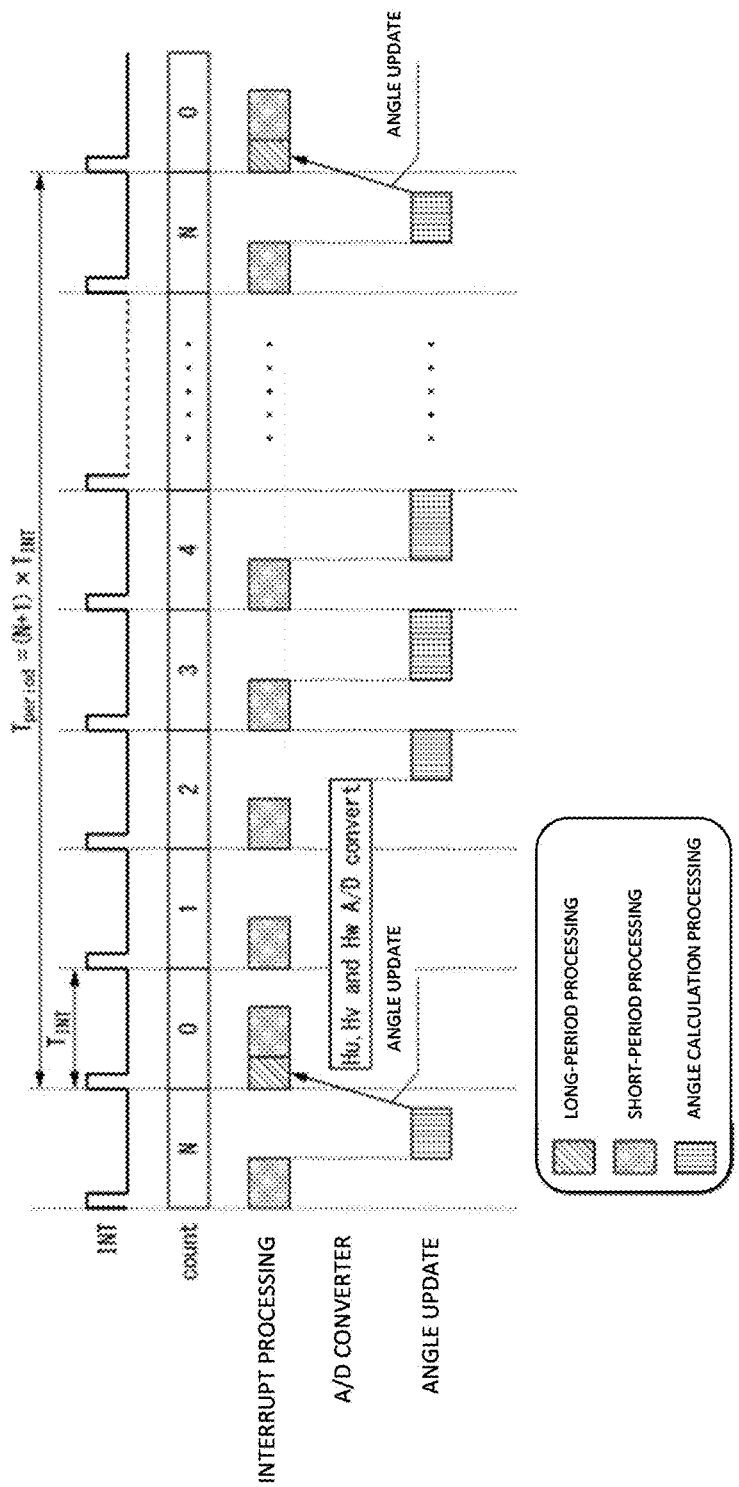
FIG. 3 is a timing chart showing a temporal correspondence relationship among an occurrence timing of an interrupt signal, a change timing of the interrupt frequency, an execution timing of interrupt processing, an operation timing of an A/D converter, and an execution timing of angle calculation processing.

FIG. 3 is a timing chart showing a temporal correspondence relationship among the occurrence timing of the interrupt signal INT, the change timing of the interrupt frequency count, the execution timing of the interrupt processing, the operation timing of the A/D converter 11, and the execution timing of the angle calculation processing.

When the timer reset value TRES1 is set in the first timer 12, the first timer 12 increments the timer count value in synchronization with a clock signal not illustrated, and when the timer count value reaches the timer reset value TRES1, the first timer 12 outputs the interrupt signal INT and resets the timer count value. Due to this, as shown in FIG. 3, the interrupt signal INT is output from the first timer 12 at a predetermined cycle $T_{INT}$.

As shown in FIG. 3, the processor 16 performs the interrupt processing every time the interrupt signal INT occurs. In a case where the interrupt frequency count, which is the number of times of occurrence of the interrupt signal INT, is equal to an initial value "0" at the start of the interrupt processing, the processor 16 performs predetermined short-period processing after performing predetermined long-period processing. On the other hand, in a case where the interrupt frequency count is not equal to the initial value "0", the processor 16 performs the short-period processing without performing the long-period processing.

As shown in FIG. 3, when exceeding a maximum value "N", the interrupt frequency count is reset to the initial value "0". In this manner, the cycle $T_{period}$ in which the interrupt frequency count is reset is referred to as a "control cycle". A control cycle $T_{period}$ is expressed by the following Expression (1). The long-period processing included in the interrupt processing is processing repeatedly executed at a cycle equal to the control cycle $T_{period}$. The short-period processing included in the interrupt processing is processing repeatedly executed at a cycle equal to the occurrence cycle $T_{INT}$ of the interrupt signal INT.

$$T_{period}=(N+1)\times T_{INT} \quad (1)$$

When the rotor rotates, the magnetic flux detection signals Hu, Hv, and Hw having a phase difference of 120° in electrical angle with one another are output from the sensor unit 20. As shown in FIG. 3, the A/D converter 11 starts digital conversion of the magnetic flux detection signals Hu, Hv, and Hw when the interrupt frequency count is the initial value "0", and ends the digital conversion when the interrupt frequency count is "2", for example. That is, digital data of the magnetic flux detection signals Hu, Hv, and Hw in one control cycle are obtained in a period where the interrupt frequency count changes from the initial value "0" to "2". As shown in FIG. 3, upon acquiring the digital data of the magnetic flux detection signals Hu, Hv, and Hw, the processor 16 executes the angle calculation processing in a period where the interrupt processing is not executed.

In the angle calculation processing, the processor 16 calculates the absolute angle θ of the rotor based on the digital data of the magnetic flux detection signals Hu, Hv, and Hw. As a calculation algorithm for the absolute angle θ, for example, an algorithm described in Japanese Patent No. 6233532 can be used. Therefore, an explanation on the calculation algorithm for the absolute angle θ is omitted in the present description. However, the calculation algorithm for the absolute angle θ is not limited to the algorithm described in Japanese Patent No. 6233532. Another calculation algorithm may be used as long as the algorithm can calculate the absolute angle of the rotating body.

As shown in FIG. 3, when the interrupt frequency count is the maximum value "N", the angle calculation processing executed within one control cycle ends. Upon ending the angle calculation processing, the processor 16 substitutes the calculation result of the absolute angle θ into a global variable gwTheta. The cycle in which the value of the global variable gwTheta indicating the absolute angle θ is rewritten to a new value is equal to the control cycle $T_{period}$. In other words, the control cycle $T_{period}$ is a cycle in which the absolute angle θ of the rotor is updated.

Figure 4:
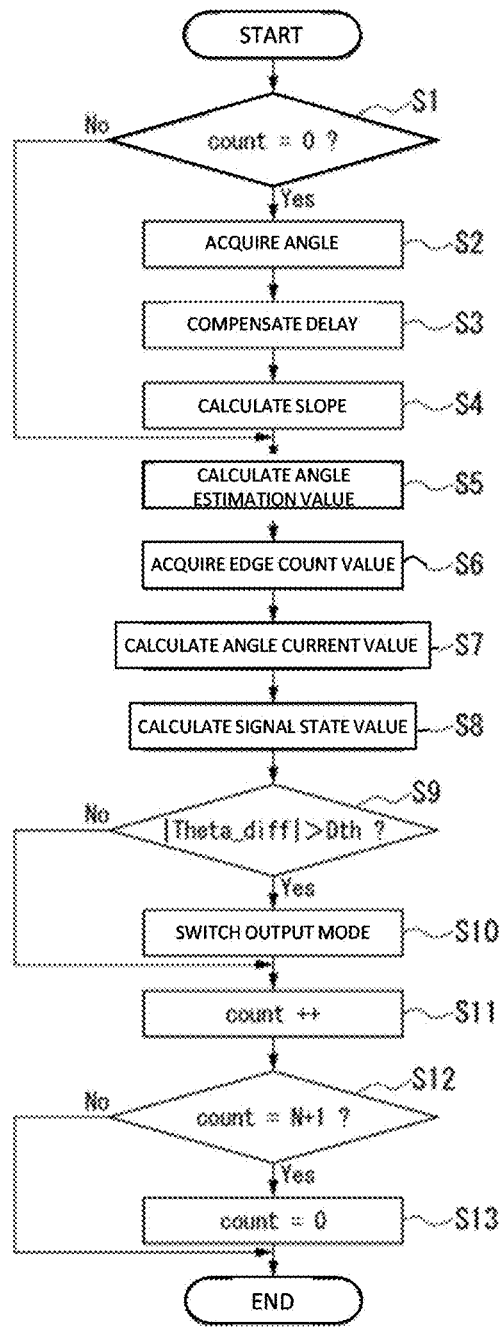
FIG. 4 is a flowchart showing interrupt processing executed by a processor in the first example embodiment.

FIG. 4 is a flowchart showing interrupt processing executed by the processor 16. As described above, when the interrupt signal INT is input from the first timer 12, the processor 16 executes the interrupt processing shown in FIG. 4. As shown in FIG. 4, upon starting the interrupt processing, the processor 16 first determines whether or not the interrupt frequency count is equal to the initial value "0" (step S1). If "Yes" in step S1, that is, if the interrupt frequency count is equal to the initial value "0", the processor 16 proceeds to the processing of step S2. On the other hand, if "No" in step S1, that is, if the interrupt frequency count is not equal to the initial value "0", the processor 16 proceeds to the processing of step S5.

In the interrupt processing shown in FIG. 4, the processing from step S2 to step S4 is the long-period processing. In the interrupt processing shown in FIG. 4, the processing from step S5 to step S13 is the short-period processing. That is, when the interrupt frequency count is equal to the initial value "0", the processor 16 executes the long-period processing including the processing from step S2 to step S4, and then executes the short-period processing including the processing from step S5 to step S13. On the other hand, if the interrupt frequency count is not equal to the initial value "0", the processor 16 executes the short-period processing without performing the long-period processing.

The processor 16 executes, as one processing of the long-period processing, angle acquisition processing of acquiring a current value of an absolute angle θ of a rotor (step S2). Specifically, in step S2, the processor 16 acquires the value of the global variable gwTheta as a current value Theta of the absolute angle θ. As shown in FIG. 3, the current value Theta of the absolute angle θ is the value of the absolute angle θ calculated in the control cycle immediately before the current control cycle.

Next, the processor 16 executes, as one processing of the long-period processing, function calculation processing of calculating an absolute angle function expressing the absolute angle θ as a linear function of time based on the current value Theta of the absolute angle θ and a previous value Theta_prev of the absolute angle θ (steps S3 and S4). Note that the previous value Theta_prev of the absolute angle θ is the value of the absolute angle θ calculated in the control cycle two cycles before the current control cycle.

Specifically, the processor 16 executes, as one of the function calculation processing, intercept calculation processing of calculating an intercept of the absolute angle function by performing delay compensation on the current value Theta of the absolute angle θ (step S3). The current value Theta of the absolute angle θ includes the following time delay component. As described above, the current value Theta of the absolute angle θ is the value of the absolute angle θ calculated in the control cycle immediately before the current control cycle. Therefore, the current value Theta of the absolute angle θ has a time delay corresponding to one control cycle. The current value Theta of the absolute angle θ has a time delay caused by a response delay of the magnetic sensors 21, 22, and 23. Furthermore, when a low-pass filter is provided for the magnetic flux detection signals Hu, Hv, and Hw, the current value Theta of the absolute angle θ has a time delay caused by the frequency characteristics of the low-pass filter.

Figure 5:
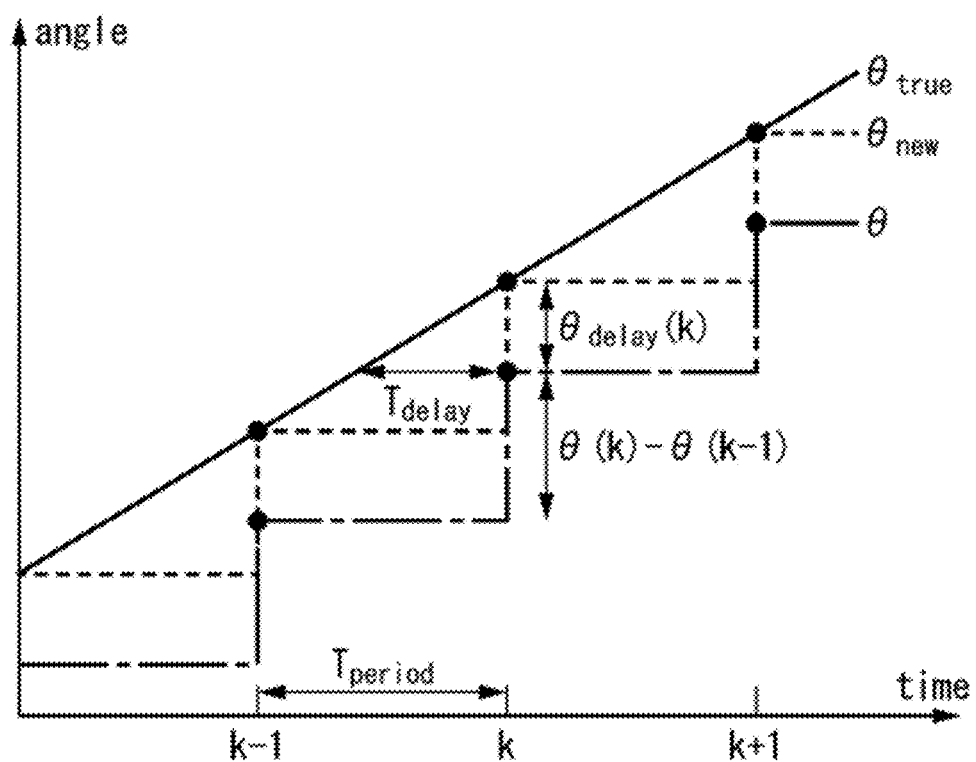
FIG. 5 is an explanatory view regarding delay compensation of an absolute angle according to an example embodiment of the present disclosure.

In step S3, the processor 16 performs delay compensation on the current value Theta of the absolute angle θ having the above-described time delay component. In FIG. 5, θ is the absolute angle θ calculated by angle calculation processing, $θ_{true}$ is a true value of the absolute angle θ, and $θ_{new}$ is the delay-compensated absolute angle θ. As shown in FIG. 5, when a time delay $T_{delay}$ exists at the absolute angle θ, an angle error $θ_{delay}$ occurs at the absolute angle θ with respect to the true value $θ_{new}$. In this case, the delay-compensated absolute angle $θ_{new}$ is expressed by the following Expression (2). In the following Expression (2), θ(k) is equal to the current value Theta of the absolute angle θ, and θ(k−1) is equal to the previous value Theta_prev of the absolute angle θ. In the following Expression (2), the second term on the right side is equal to the angle error $θ_{delay}$.

[Math. 1]

$$\theta_{new}(k) = \theta(k) + \frac{T_{delay}}{T_{period}}\{\theta(k) - \theta(k-1)\} \tag{2}$$

In step S3, the processor 16 calculates, as an intercept of the absolute angle function, the delay-compensated absolute angle $θ_{new}$ based on the above Expression (2). The processor 16 acquires, as an intercept Theta_new_low, the calculation result of the delay-compensated absolute angle $θ_{new}$. Note that, as the time delay $T_{delay}$ included in the above Expression (2), a calculation value obtained by performing a simulation in consideration of the factor of the time delay described above may be used, or an actual measurement value obtained by conducting an experiment may be used.

Next, as one of the function calculation processing, the processor 16 executes slope calculation processing of calculating a slope of the absolute angle function by subtracting the previous value Theta_prev from the current value Theta of the absolute angle θ (step S4). Specifically, in step S4, the processor 16 calculates a slope Theta_extr of the absolute angle function based on the following Expression (3).

Theta_extr=Theta−Theta_prev (3)

By the processor 16 executing the function calculation processing including steps S3 and S4 described above, an absolute angle function θ(count) expressed by the following Expression (4) is finally obtained.

θ(count)=Theta_new_low+Theta_extr/(N+1)×count (4)

The above processing from step S2 to step S4 is the long-period processing repeatedly executed at a cycle equal to the control cycle $T_{period}$. Subsequently, the short-period processing will be described.

The processor 16 executes, as one of the short-period processing, angle estimation value calculation processing of calculating an estimation value of the absolute angle θ as an angle estimation value based on the absolute angle function calculated by the function calculation processing (step S5). Specifically, in step S5, the processor 16 acquires, as an angle estimation value Theta_est, a value of θ(count) calculated by substituting the value of the interrupt frequency count into the above Expression (4).

Next, the processor 16 executes count value acquisition processing of acquiring the edge count value EC from the third timer 14 (step S6), and executes angle current value calculation processing of calculating the current value of the absolute angle θ as the angle current value based on the acquired edge count value EC (step S7). Specifically, in step S7, the processor 16 calculates an angle current value Theta_edge_now based on the following Expression (5).

$$\text{Theta\_edge\_now} = \text{edge\_now} \times \text{EDGE2THETA} \quad (5)$$

In the above Expression (5), edge_now is a variable into which the edge count value EC is substituted. EDGE2THETA is a coefficient for converting the edge count value EC into, for example, a 32 bit angle. Assuming that the resolution of the signal generation device 10 is N_EDGE, EDGE2THETA is expressed by the following Expression (6). The resolution is the number of edges occurring in the A-phase pulse signal PA and the B-phase pulse signal PB during one rotation of the rotor.

$$\text{EDGE2THETA} = 2^{\wedge}32/N\_\text{EDGE} \quad (6)$$

Next, the processor 16 executes signal state value calculation processing of calculating a signal state value State based on the edge count value EC (step S8). As described already, the signal state value State is a value representing the relationship between the level of the A-phase pulse signal PA and the level of the B-phase pulse signal PB (see FIG. 2). Specifically, in step S8, the processor 16 calculates the signal state value State based on the following Expression (7). The following Expression (7) means that the logical product of the value of the variable edge_now and 3 (11 in binary representation) is calculated in order to acquire the lower 2 bits of the variable edge_now indicating the edge count value EC.

$$\text{State} = \text{edge\_now} \cdot (11) \quad (7)$$

Next, the processor 16 executes timing determination processing of determining whether or not it is a timing to change the output mode of the second timer 13 based on the angle estimation value Theta_est calculated in step S5 and the angle current value Theta_edge_now calculated in step S7 (step S9). Specifically, in step S9, the processor 16 determines whether or not the absolute value of a difference value Theta_diff_low obtained by subtracting the angle current value Theta_edge_now from the angle estimation value Theta_est is larger than a predetermined threshold Dth (second threshold). Note that the processor 16 calculates the difference value Theta_diff_low based on the following Expression (8).

$$\text{Theta\_diff\_low} = \text{Theta\_est} - \text{Theta\_edge\_now} \quad (8)$$

If "Yes" in step S9, that is, if the absolute value of the difference value Theta_diff_low is larger than the predetermined threshold Dth, the processor 16 determines that it is the timing to change the output mode of the second timer 13 and proceeds to the processing of step S10. On the other hand, if "No" in step S9, that is, if the absolute value of the difference value Theta_diff_low is equal to or less than the predetermined threshold Dth, the processor 16 proceeds to the processing of step S11 without performing the processing of step S10.

When it is determined that it is the timing to change the output mode in the timing determination processing, the processor 16 executes first output mode switching processing of changing the output mode of one of the A-phase pulse signal PA and the B-phase pulse signal PB to one of the high-level output mode and the low-level output mode based on the signal state value State (step S10).

Specifically, in step S10, when the signal state value State is "0", the processor 16 sets both the output mode of the A-phase pulse signal PA and the output mode of the B-phase pulse signal PB to the high-level output mode. In step S10, when the signal state value State is "1", the processor 16 sets the output mode of the A-phase pulse signal PA to the high-level output mode and sets the output mode of the B-phase pulse signal PB to the low-level output mode. In step S10, when the signal state value State is "2", the processor 16 sets both the output mode of the A-phase pulse signal PA and the output mode of the B-phase pulse signal PB to the low-level output mode. In step S10, when the signal state value State is "3", the processor 16 sets the output mode of the A-phase pulse signal PA to the low-level output mode and sets the output mode of the B-phase pulse signal PB to the high-level output mode.

After performing the processing of step S10 or when determining "No" in step S9, the processor 16 executes the interrupt frequency update processing of updating the interrupt frequency count (step S11). Specifically, in step S11, the processor 16 increments the value of the interrupt frequency count.

Next, if the updated interrupt frequency count is equal to a predetermined threshold M (first threshold), the processor 16 executes the interrupt frequency reset processing of resetting the interrupt frequency count to the initial value "0" (steps S12 and S13). Specifically, the processor 16 determines whether or not the interrupt frequency count is equal to the threshold M (step S12). The threshold M is a value obtained by adding "1" to the maximum value "N" of the interrupt frequency count. If "Yes" in step S12, that is, if the interrupt frequency count is equal to the threshold M (=N+1), the processor 16 resets the interrupt frequency count to the initial value "0" and ends the interrupt processing (step S13). On the other hand, if "No" in step S12, that is, if the interrupt frequency count is not equal to the threshold M, the processor 16 ends the interrupt processing without performing the processing of step S13.

Every time the interrupt signal INT occurs, the processor 16 performs the interrupt processing as described above, whereby the A-phase pulse signal PA and the B-phase pulse signal PB are output from the second timer 13. Hereinafter, an example in which the A-phase pulse signal and the B-phase pulse signal are output from the second timer 13 by the interrupt processing of the first example embodiment will be described with reference to FIG. 6.

Figure 6:
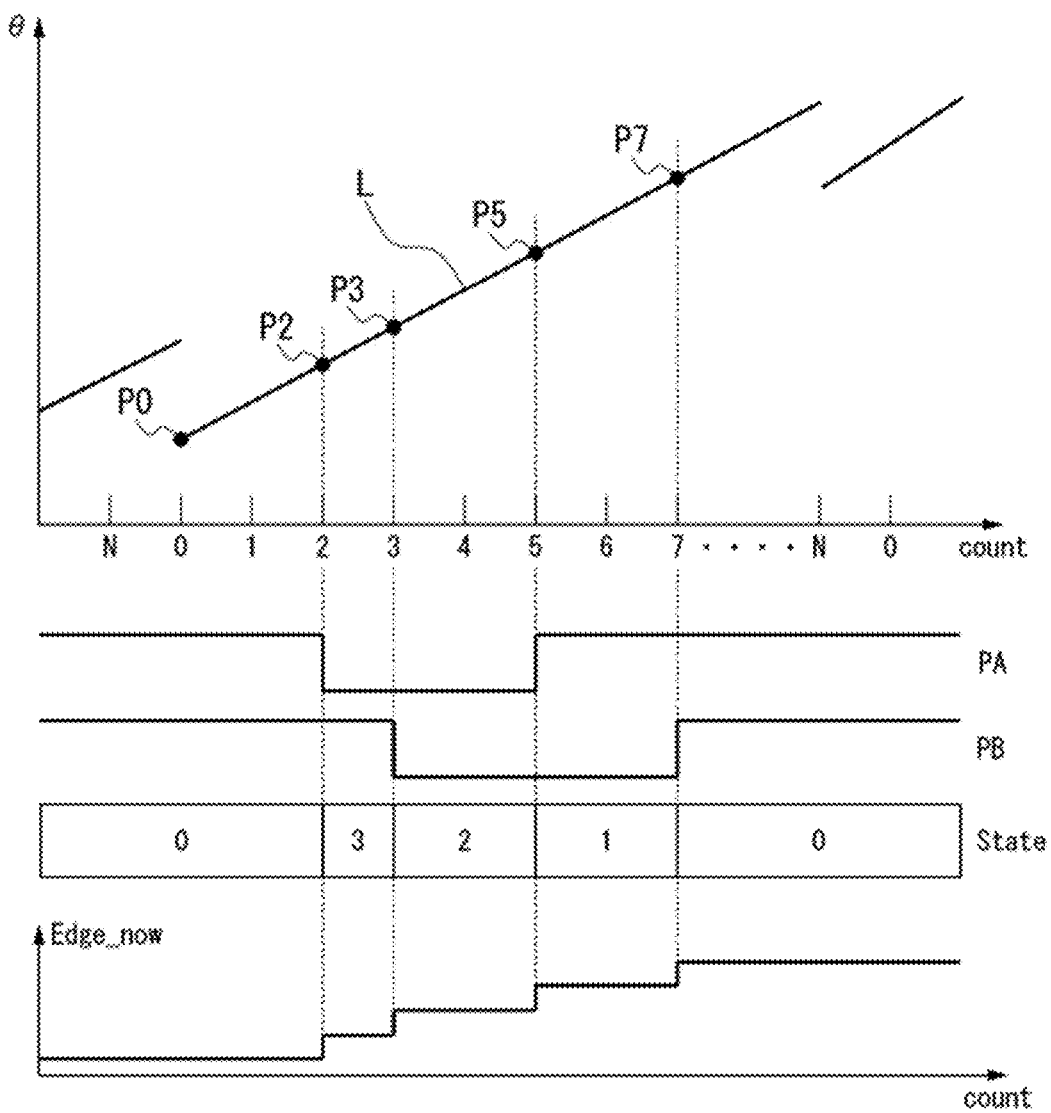
FIG. 6 is a view showing an example in which an A-phase pulse signal and a B-phase pulse signal are output from a second timer by interrupt processing of the first example embodiment.

In FIG. 6, a straight line L indicates the absolute angle function θ(count) calculated when the interrupt frequency count is "0". The slope of the straight line L is the slope Theta_extr of the absolute angle function θ (count). The value of a point PO on the straight line L is the angle estimation value Theta_est calculated when the interrupt frequency count is "0". The value of the point PO is equal to the intercept Theta_new_low of the absolute angle function θ (count). The value of a point P2 on the straight line L is the angle estimation value Theta_est calculated when the interrupt frequency count is "2". The value of a point P3 on the straight line L is the angle estimation value Theta_est calculated when the interrupt frequency count is "3". The value of a point P5 on the straight line L is the angle estimation value Theta_est calculated when the interrupt frequency count is "5". The value of a point P7 on the straight line L is the angle estimation value Theta_est calculated when the interrupt frequency count is "7".

As shown in FIG. 6, it is assumed that before the interrupt frequency count changes to "2", the signal state value State is "0" and both the output mode of the A-phase pulse signal PA and the output mode of the B-phase pulse signal PB are set to the high-level output mode. In this case, before the interrupt frequency count changes to "2", both the A-phase pulse signal PA and the B-phase pulse signal PB output from the second timer 13 become a high level.

As shown in FIG. 6, it is assumed that when the interrupt frequency count changes to "2", the signal state value State becomes "3" and the absolute value of the difference value Theta_diff_low between the angle estimation value Theta_est (value of the point P2) and the angle current value Theta_edge_now becomes larger than the threshold Dth. In this case, the processor 16 changes only the output mode of the A-phase pulse signal PA to the low-level output mode based on the signal state value State. As a result, as shown in FIG. 6, at the timing when the interrupt frequency count changes to "2", only the A-phase pulse signal PA output from the second timer 13 changes to the low level.

As shown in FIG. 6, it is assumed that when the interrupt frequency count changes to "3", the signal state value State becomes "2" and the absolute value of the difference value Theta_diff_low between the angle estimation value Theta_est (value of the point P3) and the angle current value Theta_edge_now becomes larger than the threshold Dth. In this case, the processor 16 changes only the output mode of the B-phase pulse signal PB to the low-level output mode based on the signal state value State. As a result, as shown in FIG. 6, at the timing when the interrupt frequency count changes to "3", only the B-phase pulse signal PB output from the second timer 13 changes to the low level.

As shown in FIG. 6, it is assumed that when the interrupt frequency count changes to "5", the signal state value State becomes "1" and the absolute value of the difference value Theta_diff_low between the angle estimation value Theta_est (value of the point P5) and the angle current value Theta_edge_now becomes larger than the threshold Dth. In this case, the processor 16 changes only the output mode of the A-phase pulse signal PA to the high-level output mode based on the signal state value State. As a result, as shown in FIG. 6, at the timing when the interrupt frequency count changes to "5", only the A-phase pulse signal PA output from the second timer 13 changes to the high level.

As shown in FIG. 6, it is assumed that when the interrupt frequency count changes to "7", the signal state value State becomes and the absolute value of the difference value Theta_diff_low between the angle estimation value Theta_est (value of the point P7) and the angle current value Theta_edge_now becomes larger than the threshold Dth. In this case, the processor 16 changes only the output mode of the B-phase pulse signal PB to the high-level output mode based on the signal state value State. As a result, as shown in FIG. 6, at the timing when the interrupt frequency count changes to "7", only the B-phase pulse signal PB output from the second timer 13 changes to the high level.

Figure 7:
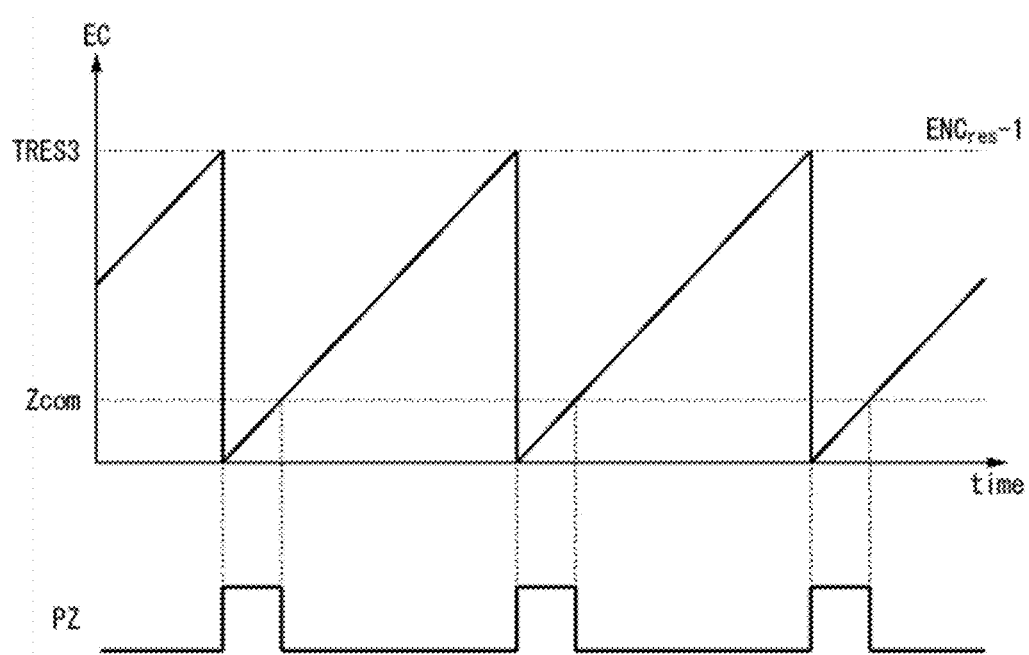
FIG. 7 is a view showing the operation of a third timer according to an example embodiment of the present disclosure.

When the A-phase pulse signal PA and the B-phase pulse signal PB are output from the second timer 13 by the interrupt processing as described above, as shown in FIG. 7, the third timer 14 counts the number of edges of the A-phase pulse signal PA and the B-phase pulse signal PB, and resets the edge count value EC when the edge count value EC reaches the timer reset value TRES3. As shown in FIG. 7, the third timer 14 compares the edge count value EC with the Z-phase output threshold Zcom, and outputs, as the Z-phase pulse signal PZ, a signal that becomes a high level when the edge count value EC is smaller than the Z-phase output threshold Zcom. In FIG. 7, $ENC_{res}$ indicates the resolution. The timer reset value TRES3 is set to a value of "$ENC_{res}-1$".

Figure 8:
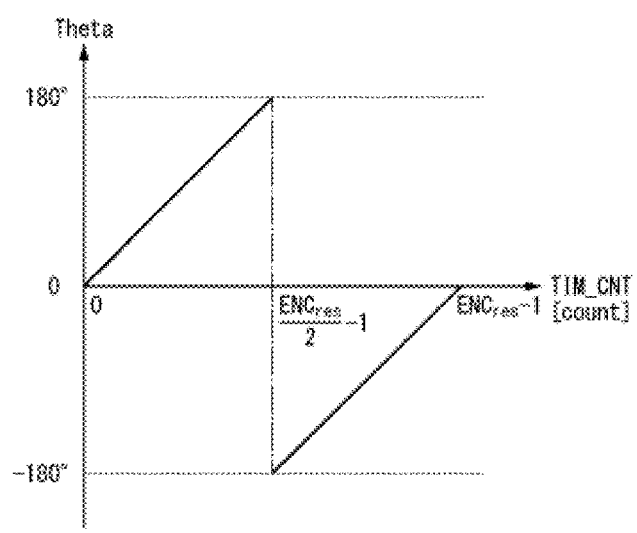
FIG. 8 is a view showing a correspondence relationship between an absolute angle and an edge count value according to an example embodiment of the present disclosure.

Since the edge count value of the third timer 14 is "0" when the signal generation device 10 is switched to the power-on state, it is necessary to set the initial value of the edge count value in accordance with the absolute angle so as to achieve the relationship shown in FIG. 8. Therefore, in the present example embodiment, when the signal generation device 10 is switched to the power-on state, the processor 16 performs processing of setting the initial value of the edge count value EC based on the following Expressions (9) and (10) as one initialization processing. In the following Expressions (9) and (10), TIM_CNT represents an initial value of the edge count value. In the present description, (uint32) (X) represents casting X to unsigned 32 bits, and Y>>Z represents shifting Y to the right by Z bits.

[Math. 2]

$$\text{WHEN Theta} \geq 0 \ \text{TIM\_CNT} = (\text{uint32})(((\text{Theta} >> 16) \times ENC_{res}) >> 16) \quad (9)$$

[Math. 3]

$$\text{WHEN Theta} < 0 \ \text{TIM\_CNT} = (\text{uint32})(ENC_{res} - ((((-1) * \text{Theta}) >> 16) \times ENC_{res}) >> 16) \quad (10)$$

As described above, the signal generation device 10 of the first example embodiment includes: the first timer 12 that outputs the interrupt signal INT at a predetermined cycle; the second timer 13 that outputs the A-phase pulse signal PA and the B-phase pulse signal PB that have a predetermined phase difference; the third timer 14 that counts the number of edges of the A-phase pulse signal PA and the B-phase pulse signal PB; and the processor 16 that performs interrupt processing of controlling the output mode of the second timer 13 every time the interrupt signal INT occurs.

When the interrupt frequency is equal to the initial value at the start of the interrupt processing, the processor 16 performs predetermined short-period processing after performing predetermined long-period processing. On the other hand, when the interrupt frequency is not equal to the initial value, the processor 16 performs the short-period processing without the performing long-period processing.

The processor 16 executes the angle acquisition processing and the function calculation processing as the long-period processing. The processor 16 executes, as the short-period processing, the angle estimation value calculation processing, the count value acquisition processing, the angle current value calculation processing, the signal state value calculation processing, the timing determination processing, the first output mode switching processing, the interrupt frequency update processing, and the interrupt frequency reset processing.

According to the signal generation device 10 of the first example embodiment as described above, it is possible to generate the A-phase pulse signal PA and the B-phase pulse signal PB from the absolute angle of a rotating body by software processing by the processor 16, which is a processor core, without using hardware other than the three timers. The timer is a circuit generally mounted on a general-purpose microcomputer such as an MCU. Therefore, according to the present example embodiment, it is possible to provide the signal generation device 10 that can simplify software and hardware necessary for generating two-phase pulse signals having a predetermined phase difference and can be achieved by an inexpensive general-purpose microcomputer.

In the first example embodiment, in the function calculation processing, the processor 16 executes the intercept calculation processing of calculating the intercept of the absolute angle function by performing delay compensation on the current value of the absolute angle, and the slope calculation processing of calculating the slope of the absolute angle function by subtracting the previous value from the current value of the absolute angle.

Thus, it is possible to obtain the angle estimation value more accurately by calculating the intercept of the absolute angle function necessary for calculation of the estimation value of the absolute angle (angle estimation value) in consideration of the delay time existing in the current value of the absolute angle.

In the first example embodiment, in the timing determination processing, if the absolute value of the difference value obtained by subtracting the angle current value from the angle estimation value is larger than the predetermined second threshold (Dth), the processor 16 determines that it is the timing to change the output mode of the second timer 13.

This can suppress chattering occurring in the A-phase pulse signal PA and the B-phase pulse signal PB. The balance between the suppression degree of chattering and the responsiveness can be adjusted by the setting value of the second threshold (Dth).

In the first example embodiment, the third timer 14 resets the edge count value when the edge count value reaches a predetermined timer reset value.

According to this, the resolution can be arbitrarily adjusted by setting of the timer reset value of the third timer 14.

In the first example embodiment, the third timer 14 compares the edge count value with the predetermined third threshold (Zcom), and outputs, as the Z-phase pulse signal PZ indicating the origin of the absolute angle, a signal that becomes a high level when the edge count value is smaller than the third threshold.

This can generate the Z-phase pulse signal PZ indicating the origin of the absolute angle based on the number of edges of the A-phase pulse signal PA and the B-phase pulse signal PB.

Next, the second example embodiment of the present disclosure will be described.

The configuration of the signal generation device 10 in the second example embodiment is similar to that in the first example embodiment. However, the interrupt processing executed by the processor 16 in the second example embodiment is different from the interrupt processing in the first example embodiment. In the interrupt processing in the second example embodiment, the A-phase pulse signal PA and the B-phase pulse signal PB are generated in a state where appropriate accuracy is maintained in accordance with a rotation speed by switching the operation mode between a low-speed mode and a high-speed mode in accordance with the rotation speed of the rotor.

Figure 9:
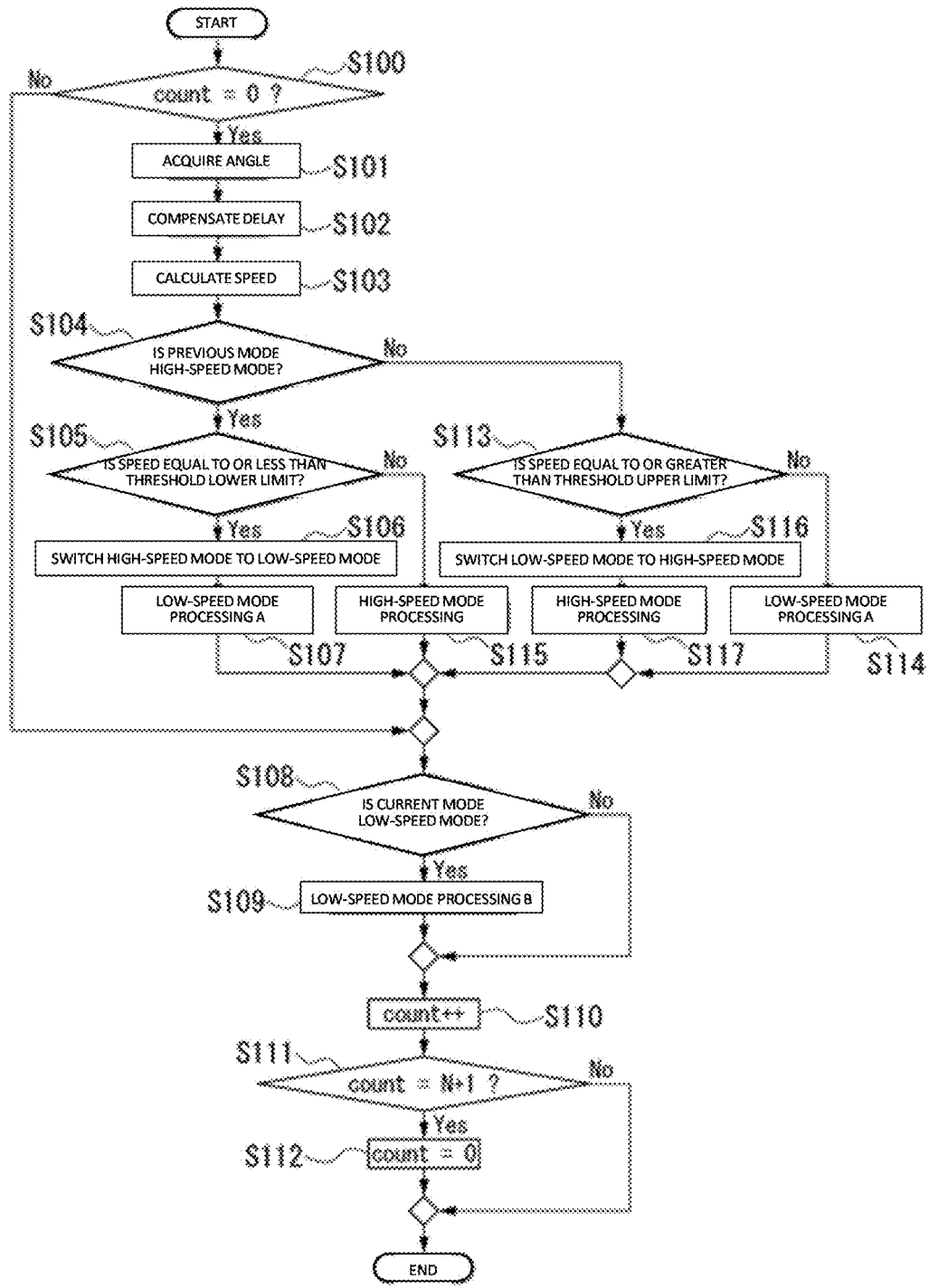
FIG. 9 is a flowchart showing interrupt processing executed by a processor in a second example embodiment of the present disclosure.

FIG. 9 is a flowchart showing interrupt processing executed by the processor 16 in the second example embodiment. When the interrupt signal INT is input from the first timer 12, the processor 16 executes the interrupt processing shown in FIG. 9.

As shown in FIG. 9, upon starting the interrupt processing, the processor 16 first determines whether or not the interrupt frequency count is equal to the initial value "0" (step S100). If "Yes" in step S100, that is, if the interrupt frequency count is equal to the initial value "0", the processor 16 proceeds to the processing of step S101. On the other hand, if "No" in step S100, that is, if the interrupt frequency count is not equal to the initial value "0", the processor 16 proceeds to the processing of step S108.

In the interrupt processing shown in FIG. 9, the processing from step S101 to step S107 and the processing from step S113 to step S117 are included in the long-period processing. In the interrupt processing shown in FIG. 9, the processing from step S108 to step S112 is included in the short-period processing. That is, when the interrupt frequency count is equal to the initial value "0", the processor 16 executes the long-period processing including step S101 to step S107 and step S113 to step S117, and then executes the short-period processing including step S108 to step S112. On the other hand, if the interrupt frequency count is not equal to the initial value "0", the processor 16 executes the short-period processing without performing the long-period processing.

The processor 16 executes, as one processing of the long-period processing, the angle acquisition processing of acquiring the current value Theta of the absolute angle θ of the rotor (step S101). Since the processing in this step S101 is the same as the processing in step S2 in the first example embodiment, the description thereof will be omitted.

Next, the processor 16 executes, as one processing of the long-period processing, the intercept calculation processing of calculating the intercept Theta_new_low of the absolute angle function by performing delay compensation on the current value Theta of the absolute angle θ (step S102). Since the processing in this step S102 is the same as the processing in step S3 in the first example embodiment, the description thereof will be omitted.

Next, the processor 16 executes, as one processing of the long-period processing, speed calculation processing of calculating the rotation speed of the rotor based on the current value Theta and the previous value Theta_prev of the absolute angle (step S103). Specifically, in step S103, the processor 16 calculates a rotation speed Speed of the rotor based on the following Expressions (11) and (12).

[Math. 4]

$$Theta\_diff = Theta - Theta\_prev \quad (11)$$

$$Speed = |Theta\_diff|. \quad (12)$$

Next, the processor 16 executes, as one processing of the long-period processing, first operation mode determination processing of determining whether or not the operation mode is the high-speed mode (step S104). In the first operation mode determination processing, when it is determined that the operation mode is the high-speed mode, that is, if "Yes" in step S104, the processor 16 executes lower limit threshold determination processing of determining whether or not the rotation speed Speed is equal to or less than a predetermined lower limit threshold (step S105).

For example, the reference value of the rotation speed for switching the operation mode is expressed by the following Expression (13). In the following Expression (13), $ENC_{res}$ is the resolution, and $f_{LOW\_algo}$ is equal to an occurrence frequency (reciprocal of the cycle $T_{INT}$) of the interrupt signal INT. For example, the lower limit threshold in the following description may be set to −20% of the reference value expressed by the following Expression (13), and the upper limit threshold may be set to +20% of the reference value expressed by the following Expression (13).

[Math. 5]

$$\omega_{th} = \frac{f_{Low\_algo} * 60}{ENC_{res}} * 0.5 \, [rpm] \quad (13)$$

In the lower limit threshold determination processing, when it is determined that the rotation speed Speed is equal to or less than the lower limit threshold, that is, if "Yes" in step S105, the processor 16 executes first mode switching processing for switching the operation mode from the high-speed mode to the low-speed mode (step S106). Then, the processor 16 executes the slope calculation processing, which is one of the function calculating processing, as low-speed mode processing A (first processing of the low-speed mode) (step S107). Since the slope calculation processing is the same as the processing of step S4 in the first example embodiment, the description thereof will be omitted. The processor 16 acquires the absolute angle function θ(count) expressed by the above Expression (4) by performing the low-speed mode processing A.

After performing the above steps S101 to S107 as the long-period processing, or if the interrupt frequency count is not equal to the initial value "0" at the start of the interrupt processing, the processor 16 executes, as the short-period processing, second operation mode determination processing of determining whether or not the operation mode is the low-speed mode (step S108).

In the second operation mode determination processing, when it is determined that the operation mode is the low-speed mode, that is, if "Yes" in step S108, the processor 16 executes, as the short-period processing, low-speed mode processing B (step S109) performed as second processing of the low-speed mode, and the interrupt frequency update processing (step S110), and the interrupt frequency resetting processing (steps S111 and S112).

The low-speed mode processing B includes the angle estimation value calculation processing (step S5), the count value acquisition processing (step S6), the angle current value calculation processing (step S7), the signal state value calculation processing (step S8), the timing determination processing (step S9), and the first output mode switching processing (step S10) in the first example embodiment. Therefore, the description of the low-speed mode processing B executed as the processing of step S109 is omitted. Since the processing from step S110 to step S112 is the same as the processing from step S11 to step S13 in the first example embodiment, the description thereof will be omitted.

In the first operation mode determination processing, when it is determined that the operation mode is not the high-speed mode, that is, if "No" in step S104, the processor 16 executes upper limit threshold determination processing of determining whether or not the rotation speed Speed is equal to or greater than a predetermined upper limit threshold (step S113).

In the upper limit threshold determination processing, when it is determined that the rotation speed Speed is not equal to or greater than the upper limit threshold, that is, if "No" in step S113, the processor 16 executes the slope calculation processing, which is one of the function calculation processing as the low-speed mode processing A (step S114). The processor 16 acquires the absolute angle function θ(count) expressed by the above Expression (4) by performing the low-speed mode processing A.

After performing the above steps S101 to S104 and steps S113 to S114 as the long-period processing, or if the interrupt frequency count is not equal to the initial value "0" at the start of the interrupt processing, the processor 16 executes, as the short-period processing, second operation mode determination processing of determining whether or not the operation mode is the low-speed mode (step S108).

In the second operation mode determination processing, when it is determined that the operation mode is the low-speed mode, that is, if "Yes" in step S108, the processor 16 executes, as the short-period processing, low-speed mode processing B (step S109) performed as second processing of the low-speed mode, and the interrupt frequency update processing (step S110), and the interrupt frequency resetting processing (steps S111 and S112).

When it is determined that the rotation speed Speed is not equal to or less than the lower limit threshold in the lower limit threshold determination processing, that is, if "No" in step S105, the processor 16 executes the processing of the high-speed mode (high-speed mode processing) as the long-period processing (step S115). After performing the above steps S101 to S105 and step S115 as the long-period processing or if the interrupt frequency count is not equal to the initial value "0" at the start of the interrupt processing, the processor 16 executes, as the short-period processing, the second operation mode determination processing of determining whether or not the operation mode is the low-speed mode (step S108), the interrupt frequency update processing (step S110), and the interrupt frequency resetting processing (steps S111 and S112).

In the upper limit threshold determination processing, when it is determined that the rotation speed Speed is equal to or greater than the upper limit threshold, that is, if "Yes" in step S113, the processor 16 executes, as the long-period processing, second mode switching processing (step S116) of switching the operation mode from the low-speed mode to the high-speed mode and the high-speed mode processing (step S117).

After performing the above-described steps S101 to S104 and steps S113, S116, and S117 by performing the long-period processing, or if the interrupt frequency count is not equal to the initial value "0" at the start of the interrupt processing, the processor 16 executes, as the short-period processing, the second operation mode determination processing (step S108) of determining whether or not the operation mode is the low-speed mode, the interrupt frequency update processing (step S110) and the interrupt frequency resetting processing (steps S111 and S112).

The processor 16 executes parameter determination processing, parameter set processing, and second output mode switching processing as the high-speed mode processing. The parameter determination processing is processing of determining the timer reset value TRES2, the first level inversion threshold Acom, and the second level inversion threshold Bcom, which are control parameters of the second timer 13. The parameter set processing is processing of setting the timer reset value TRES2, the first level inversion threshold Acom, and the second level inversion threshold Bcom in the second timer 13. The second output mode switching processing is processing of switching the output mode of the second timer 13 to the comparison output mode.

The timer reset value TRES2 of the second timer 13 is a value proportional to the reciprocal of the rotation speed.

Therefore, the smaller the timer reset value TRES2 is, the higher the output frequencies of the A-phase pulse signal PA and the B-phase pulse signal PB become, and the larger the timer reset value TRES2 is, the lower the output frequencies of the A-phase pulse signal PA and the B-phase pulse signal PB become. In the parameter determination processing, the processor 16 calculates the timer reset value TRES2 based on the following Expression (14). In the following Expression (14), TimArr(k) is the timer reset value TRES2. In the following Expression (14), $KARR_{DIV}$ is a coefficient for preventing loss of significant digits at the calculation.

[Math. 6]
$$TimArr(k) = \left(\frac{KARR + frac(k-1)}{Speed(k)}\right) \gg KARR_{DIV} \quad (14)$$

In the above Expression (14), occurrence of an accumulated error is suppressed by rounding of carrying a remainder frac(k) occurring at the division over to the next control cycle. frac(k) is calculated based on the following Expression (15). In the following Expression (15), Quo(k) is an integer part (quotient) of an arithmetic expression in square brackets on the right side of the above Expression (14). Furthermore, KARR is set by the following Expression (16). In the following Expression (16), fc is a control frequency (reciprocal of the control cycle). In the following Expression (16), fsys is a clock frequency.

[Math. 7]
$$frac(k) = KARR + frac(k-1) - Quo(k) \times Speed(k) \quad (15)$$

[Math. 8]
$$KARR = \frac{2^{32-KARR_{DIV}}}{\frac{ENC_{res}}{2}} \times \frac{f_{sys}}{fc} \quad (16)$$

Now, it is preferable to set the value of KARR, which is a numerator, as large as possible in order to maintain the calculation accuracy in division. Therefore, it is preferable to set the value of $KARR_{DIV}$ so that KARR becomes a value smaller than $2^{32}$ and as large as possible.

In the parameter determination processing, the processor 16 calculates the first level inversion threshold Acom and the second level inversion threshold Bcom as follows. For example, in order to set the phase difference between the A-phase pulse signal PA and the B-phase pulse signal PB to 90°, the relationship of the following Expression (17) only needs to be established.

[Math. 9]
$$A_{com} - B_{com} = \frac{TimArr}{2} \quad \text{(WHEN } A_{com} > B_{com}\text{)} \quad (17)$$

The processor 16 calculates the first level inversion threshold Acom and the second level inversion threshold Bcom so that the relationship of the above Expression (17) is established. The magnitude relationship between the first level inversion threshold Acom and the second level inversion threshold Bcom is determined based on the relationship in Table 1 using the rotation direction (sign of the rotation speed Speed) and the signal state value State.

TABLE 1

| $A_{com}, B_{com}$ | Direction | State |
|---|---|---|
| $A_{com} < B_{com}$ | Positive | 1, 3 |
| $A_{com} > B_{com}$ | Positive | 0, 2 |
| $A_{com} > B_{com}$ | Negative | 1, 3 |
| $A_{com} < B_{com}$ | Negative | 0, 2 |

Figure 10:
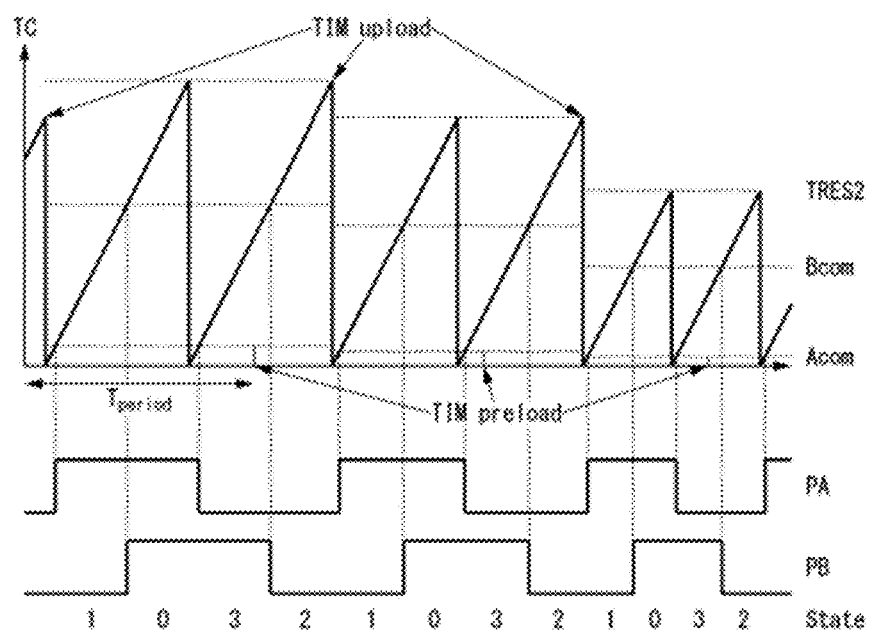
FIG. 10 is a view showing an example in which an A-phase pulse signal and a B-phase pulse signal are output from the second timer by high-speed mode processing included in interrupt processing in the second example embodiment.

The processor 16 sets the timer reset value TRES2, the first level inversion threshold Acom, and the second level inversion threshold Bcom that have been determined as described above in the second timer 13, and switches the output mode of the second timer 13 to the comparison output mode. As a result, as shown in FIG. 10, the second timer 13 increments the timer count value TC in synchronization with a clock signal not illustrated, and resets the timer count value TC every time the timer count value TC reaches the timer reset value TRES2. The second timer 13 inverts the level of the A-phase pulse signal PA every time the timer count value TC reaches the first level inversion threshold Acom, and inverts the level of the B-phase pulse signal PB every time the timer count value TC reaches the second level inversion threshold Bcom.

As described above, according to the interrupt processing in the second example embodiment, the operation mode is switched to the low-speed mode when the rotation speed of the rotor is equal to or less than the lower limit threshold, and the processing described in the first example embodiment is executed as the processing of the low-speed mode, whereby the A-phase pulse signal PA and the B-phase pulse signal PB having a phase difference of 90° are generated in a state where appropriate accuracy is maintained with respect to the rotation speed of the rotor. On the other hand, according to the interrupt processing in the second example embodiment, the operation mode is switched to the high-speed mode when the rotation speed of the rotor is equal to or greater than the upper limit threshold, and the above-described high-speed mode processing is executed, whereby the A-phase pulse signal PA and the B-phase pulse signal PB having a phase difference of 90° are generated in a state where appropriate accuracy is maintained with respect to the rotation speed of the rotor.

Thus, according to the interrupt processing in the second example embodiment, the operation mode is switched between the low-speed mode and the high-speed mode in accordance with the rotation speed of the rotor, whereby the A-phase pulse signal PA and the B-phase pulse signal PB can be generated in a state where appropriate accuracy is maintained in accordance with the rotation speed.

Next, the third example embodiment of the present disclosure will be described.

Figure 11:
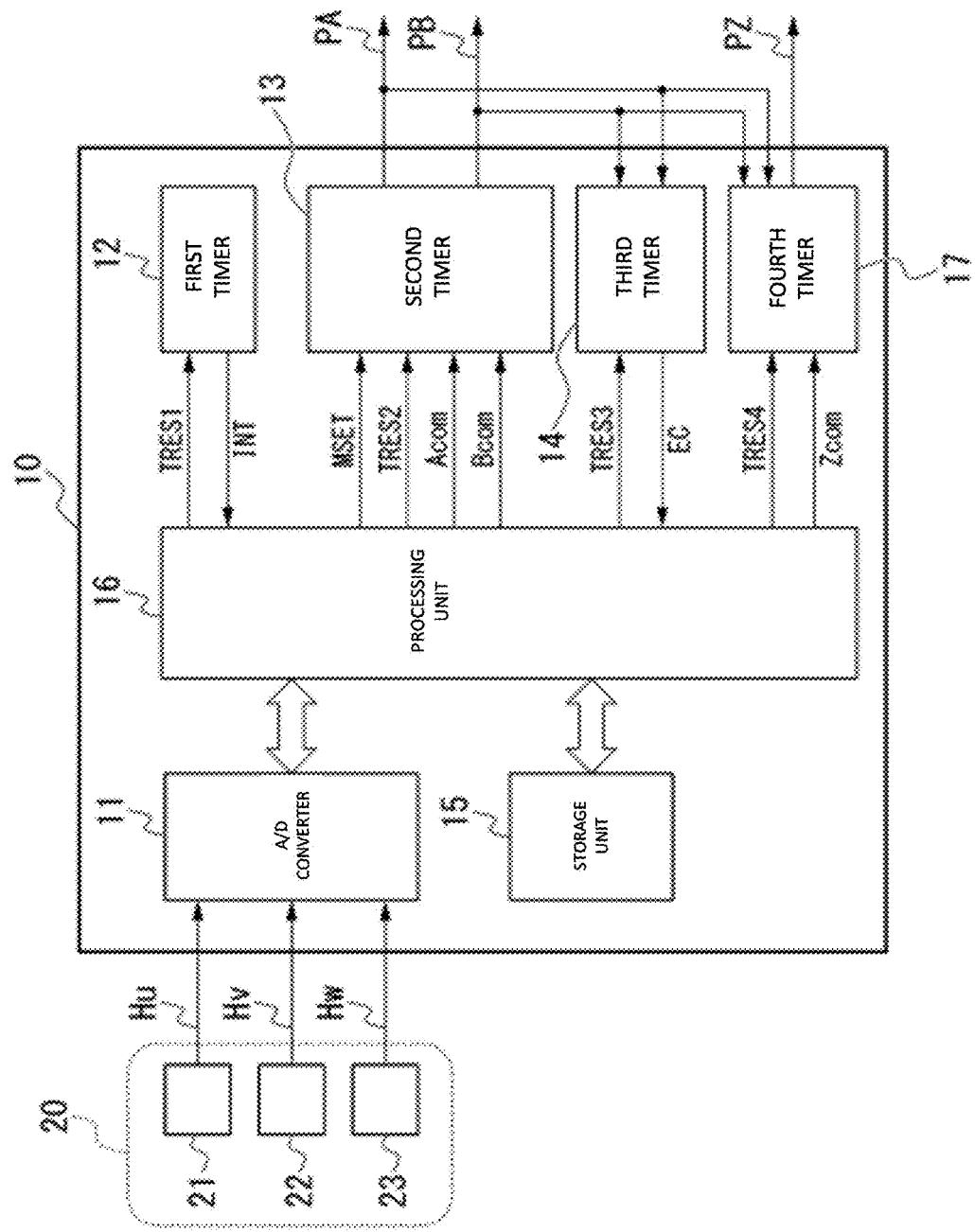
FIG. 11 is a block diagram schematically showing a configuration of a signal generation device according to a third example embodiment of the present disclosure.

FIG. 11 is a block diagram schematically showing the configuration of a signal generation device 10 according to the third example embodiment of the present disclosure. As shown in FIG. 11, the signal generation device 10 in the third example embodiment includes a fourth timer 17 in addition to the A/D converter 11, the first timer 12, the second timer 13, the third timer 14, the storage unit 15, and the processor 16.

Thus, the signal generation device 10 in the third example embodiment is different from that of the first example embodiment in newly including the fourth timer 17. The third timer 14 in the third example embodiment is different from that of the first example embodiment in not outputting the Z-phase pulse signal PZ. That is, the third timer 14 in the third example embodiment matches the first example embodiment in having a function of counting the number of edges of the A-phase pulse signal PA and the B-phase pulse signal PB output from the second timer 13 and outputting the edge count value EC to the processor 16 and a function of resetting the edge count value EC when the edge count value EC reaches the timer reset value TRES3.

The fourth timer 17 counts the number of edges of the A-phase pulse signal PA and the B-phase pulse signal PB output from the second timer 13. The fourth timer 17 resets a count value CNT when the count value CNT of the number of edges reaches a predetermined timer reset value TRES4. The fourth timer 17 compares the count value CNT of the number of edges with a predetermined Z-phase output threshold Zcom (fourth threshold), and outputs, as the Z-phase pulse signal PZ indicating the origin of the absolute angle θ, a signal that becomes a high level when the count value CNT is smaller than the Z-phase output threshold Zcom. The timer reset value TRES4 and the Z-phase output threshold Zcom are set in the fourth timer 17 by the processor 16.

Figure 12:
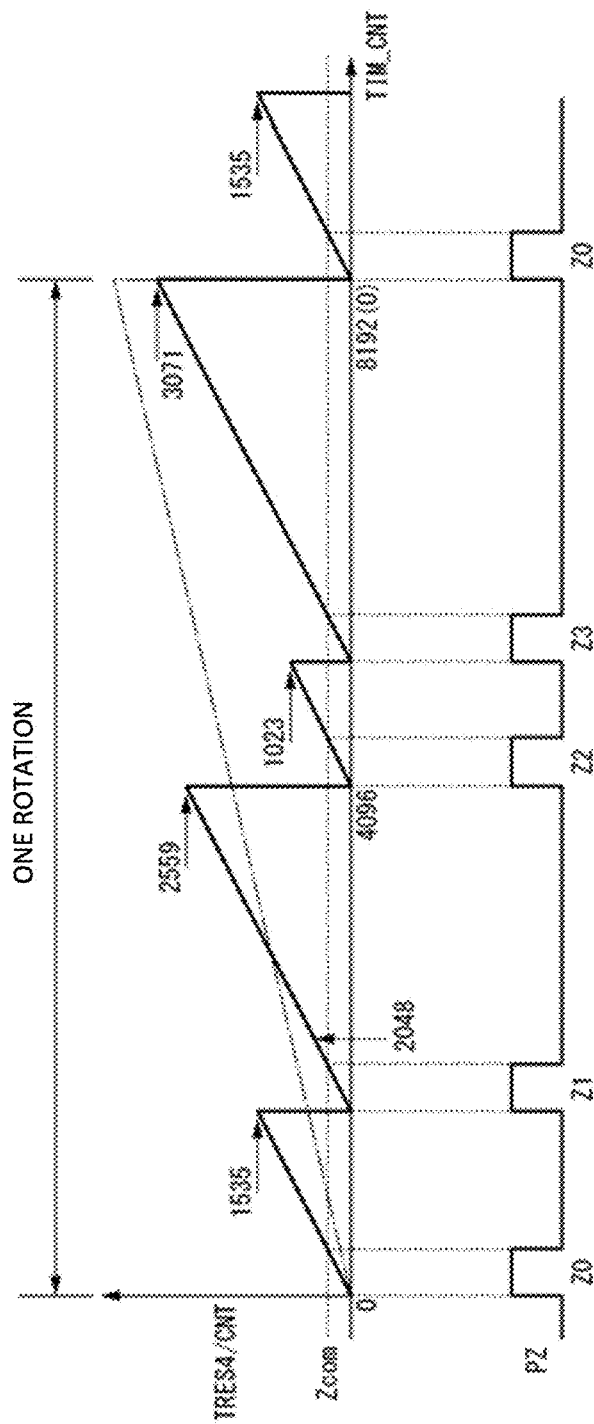
FIG. 12 is a view showing a relationship between a count value of a fourth timer according to an example embodiment of the present disclosure and a Z-phase pulse signal output from the fourth timer.

FIG. 12 is a view showing the relationship between the count value CNT of the fourth timer 17 and the Z-phase pulse signal PZ output from the fourth timer 17. In FIG. 12, the long dashed short dashed line indicates the edge count value EC of the third timer 14. FIG. 12 shows, as an example, a case where four pulse signals Z0, Z1, Z2, and Z3 are output as the Z-phase pulse signal PZ while the rotor makes one rotation. If "1535" is set as the timer reset value TRES4, the count value CNT of the fourth timer rises from "0" toward "1535", and when the count value CNT reaches "1535", the count value CNT is reset to "0". Thus, in the period where the count value CNT of the fourth timer 17 rises from "0" toward "1535", if the count value CNT is smaller than the Z-phase output threshold Zcom, the pulse signal Z0 is output as the Z-phase pulse signal PZ.

If "2559" is set as the timer reset value TRES4, the count value CNT of the fourth timer 17 rises from "0" toward "2559", and when the count value CNT reaches "2559", the count value CNT is reset to "0". Thus, in the period where the count value CNT of the fourth timer 17 rises from "0" toward "2559", if the count value CNT is smaller than the Z-phase output threshold Zcom, the pulse signal Z1 is output as the Z-phase pulse signal PZ.

If "1023" is set as the timer reset value TRES4, the count value CNT of the fourth timer 17 rises from "0" toward "1023", and when the count value CNT reaches "1023", the count value CNT is reset to "0". Thus, in the period where the count value CNT of the fourth timer 17 rises from "0" toward "1023", if the count value CNT is smaller than the Z-phase output threshold Zcom, the pulse signal Z2 is output as the Z-phase pulse signal PZ.

If "3071" is set as the timer reset value TRES4, the count value CNT of the fourth timer 17 rises from "0" toward "3071", and when the count value CNT reaches "3071", the count value CNT is reset to "0". Thus, in the period where the count value CNT of the fourth timer 17 rises from "0" toward "3071", if the count value CNT is smaller than the Z-phase output threshold Zcom, the pulse signal Z3 is output as the Z-phase pulse signal PZ.

Hereinafter, a section from the rising edge of the pulse signal Z0 to the rising edge of the pulse signal Z1 is referred to as a "Z0 section". A section from the rising edge of the pulse signal Z1 to the rising edge of the pulse signal Z2 is referred to as a "Z1 section". A section from the rising edge of the pulse signal Z2 to the rising edge of the pulse signal Z3 is referred to as a "Z2 section". Furthermore, a section from the rising edge of the pulse signal Z3 to the rising edge of the pulse signal Z0 is referred to as a "Z3 section".

During counting in the Z0 section, the processor 16 sets "2559", which is the timer reset value TRES4 used in the next Z1 section, in a shadow register, which is one of the internal registers of the fourth timer 17. When the Z0 section ends, that is, when the count value CNT of the fourth timer 17 reaches "1535" and is reset to "0", the value ("2559") of the shadow register is transferred to an auto reload register, which is one of the internal registers of the fourth timer 17, whereby the timer reset value TRES4 in the Z1 section is set.

During counting in the Z1 section, the processor 16 sets "1023", which is the timer reset value TRES4 used in the next Z2 section, in the shadow register of the fourth timer 17. When the Z1 section ends, that is, when the count value CNT of the fourth timer 17 reaches "2559" and is reset to "0", the value ("1023") of the shadow register is transferred to an auto reload register, whereby the timer reset value TRES4 in the Z2 section is set.

During counting in the Z2 section, the processor 16 sets "3071", which is the timer reset value TRES4 used in the next Z3 section, in the shadow register of the fourth timer 17. When the Z2 section ends, that is, when the count value CNT of the fourth timer 17 reaches "1023" and is reset to "0", the value ("3071") of the shadow register is transferred to an auto reload register, whereby the timer reset value TRES4 in the Z3 section is set.

During counting in the Z3 section, the processor 16 sets "1535", which is the timer reset value TRES4 used in the next Z0 section, in the shadow register of the fourth timer 17. When the Z3 section ends, that is, when the count value CNT of the fourth timer 17 reaches "3071" and is reset to "0", the value ("1535") of the shadow register is transferred to an auto reload register, whereby the timer reset value TRES4 in the Z0 section is set.

Similarly to the third timer 14, when the signal generation device 10 is switched from the power-off state to the power-on state, the count value CNT of the fourth timer 17 is reset to "0". Therefore, it is necessary to set the initial value of the count value CNT of the fourth timer 17 at the start up of the signal generation device 10. As shown in FIG. 12, for example, if the value of TIM_CNT calculated at the start up of the signal generation device 10 is "2048", the processor 16 determines that the initial position at the start up is in the Z1 section based on the table data shown in Table 2. The table data shown in Table 2 is stored in the storage unit 15 in advance.

TABLE 2

| SECTION | TRES4 | TIM_CNT |
|---|---|---|
| Z0 | 1535 | 0-1535 |
| Z1 | 2559 | 1536-4095 |
| Z2 | 1023 | 4096-5119 |
| Z3 | 3071 | 5120-8191 |

After acquiring, from the table data shown in Table 2, the timer reset value TRES4 ("1535") of the Z0 section, which is the Z section immediately before the Z1 section determined as described above, the processor 16 sets the initial value of the count value CNT of the fourth timer 17 based on the following Expression (18). If the value of TIM_CNT calculated at the start up of the signal generation device 10 is "2048", the initial value of the count value CNT of the fourth timer 17 is set to "512" by the following Expression (18).

$$\text{Initial value of count value CNT} = \text{TIM\_CNT} - (\text{TRES4 of Z0 section} + 1) \quad (18)$$

Figure 13:
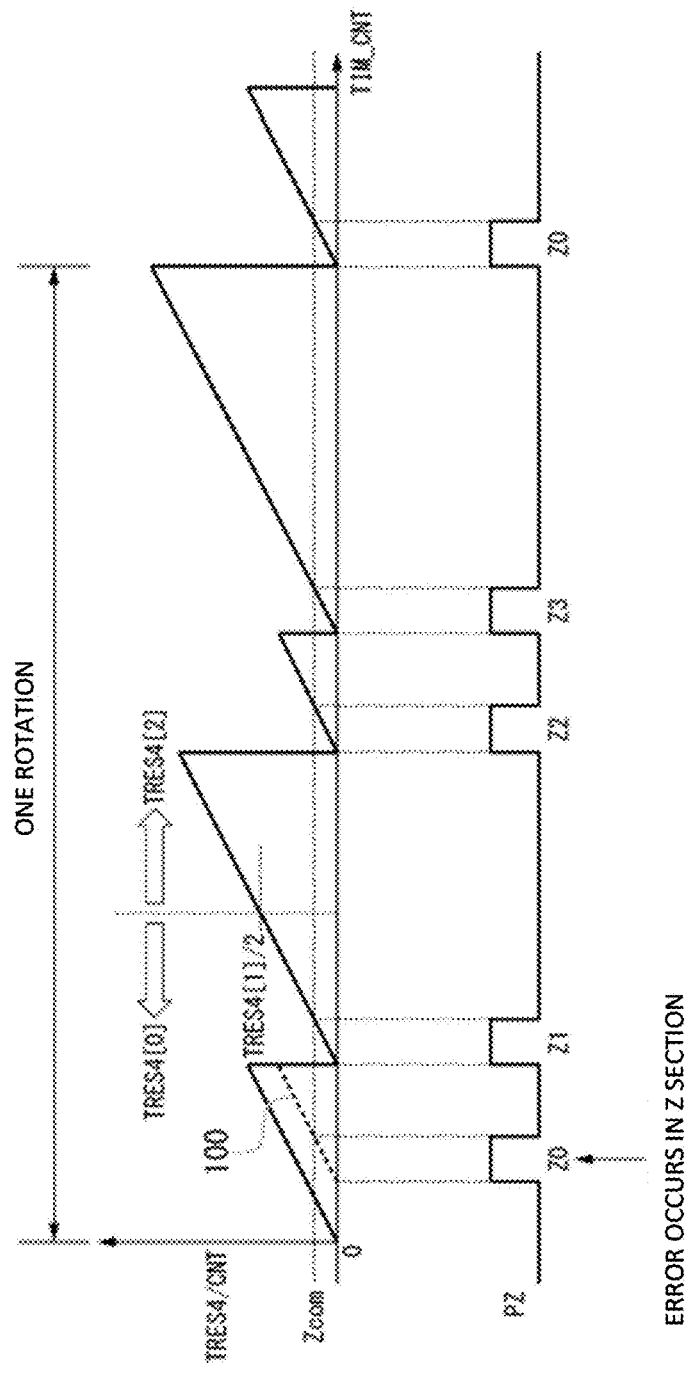
FIG. 13 is a view used to describe processing when a rotor is reversed during counting by the fourth timer.

Subsequently, processing in a case where the rotor is reversed during counting by the fourth timer 17 will be described with reference to FIG. 13. As shown in FIG. 13, when the count value CNT of the fourth timer 17 underflows in a state where "1023" is set as the timer reset value TRES4 in the auto reload register of the fourth timer 17, the count value CNT changes as indicated by a dotted line 100, and an error occurs in the Z section (In this case, the Z0 section).

Therefore, the processor 16 performs the following comparison processing in the cycle processing (i.e., short-period processing) of the first timer 12. In the following comparison processing, i represents an index of the current Z section, and TRES4[i] represents a timer reset value of the fourth timer 17 used in the current Z section.

(1) If CNT<TRES4[i]/2, set TRES4[i−1] in shadow register.

(2) If CNT>TRES4[i]/2, set TRES4[i+1] in shadow register.

For example, in FIG. 13, if the count value CNT in the Z1 section is smaller than TRES4[1]/2, the processor 16 sets TRES4[0] in the shadow register. On the other hand, in FIG. 13, if the count value CNT in the Z1 section is larger than TRES4[1]/2, the processor 16 sets TRES4[2] in the shadow register. Due to this, even if the rotor is reversed during counting in the Z1 section, it is possible to prevent an error from occurring in the Z section.

As described above, according to the third example embodiment, the plurality of Z-phase pulse signals PZ serving as the reference of the absolute angle θ can be output from the fourth timer 17 while the rotor makes one rotation. On the other hand, in the first example embodiment, since the timer reset value TRES3 of the third timer 14 is set to the value of "$ENC_{res}-1$", only one Z-phase pulse signal PZ can be output from the third timer 14 while the rotor makes one rotation. Therefore, according to the third example embodiment, it is possible to respond to a request from a customer to detect an absolute position necessary for origin adjustment in less than one rotation.

The present disclosure is not limited to the above example embodiments, and the configurations described in the present description can be appropriately combined within a range not conflicting with one another.

For example, in the second example embodiment, when the timer reset value TRES2 of the second timer 13 is set using the auto reload register, as shown in FIG. 10, the timing of updating the timer reset value TRES2 is always delayed from the original timing to be updated (identical timing to the control cycle). Therefore, an accumulated error is likely to occur in a method of simply calculating the timer reset value TRES2 (TimArr) from the rotation speed Speed. An algorithm for suppressing occurrence of such an accumulated error may be added as one of the high-speed mode processing.

For example, in the first to third example embodiments, the case where the rotating body is a rotor of a three-phase brushless DC motor has been described, but the rotating body is not limited to a rotor.

In the first to third example embodiments, the case where the sensor unit 20 has the three magnetic sensors 21, 22, and 23 has been exemplified, but the type, number, arrangement, or the like of the magnetic sensors may be appropriately changed in accordance with the type of the rotating body or the content of the calculation algorithm for the absolute angle.

Furthermore, in the first to third example embodiments, the predetermined phase difference is not limited to 90° and can be set to any value.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A signal generation device comprising:
a first timer to output an interrupt signal at a predetermined cycle;
a second timer to output a first pulse signal and a second pulse signal that have a predetermined phase difference;
a third timer to count a number of edges of the first pulse signal and the second pulse signal; and
a processor configured or programmed to perform interrupt processing to control an output mode of the second timer every time the interrupt signal occurs; wherein
the processor configured or programmed to perform predetermined short-period processing after performing predetermined long-period processing when an interrupt frequency, which is a number of times of occurrence of the interrupt signal, is equal to an initial value at a start of the interrupt processing, and to perform the short-period processing without performing the long-period processing when the interrupt frequency is not equal to the initial value;
the processor is configured or programmed to perform, as one of the long-period processing, angle acquisition processing to acquire a current value of an absolute angle of a rotating body; and function calculation processing to calculate an absolute angle function expressing the absolute angle as a linear function of time based on a current value and a previous value of the absolute angle; and
the processor is configured or programmed to perform, as the short-period processing:
angle estimation value calculation processing to calculate an estimation value of the absolute angle as an angle estimation value based on the absolute angle function calculated by the function calculation processing;
count value acquisition processing to acquire a count value of the number of edges from the third timer;
angle current value calculation processing to calculate a current value of the absolute angle as an angle current value based on the count value;
signal state value calculation processing to calculate a signal state value representing a relationship between a level of the first pulse signal and a level of the second pulse signal based on the count value;
timing determination processing to determine whether or not it is a timing to change the output mode of the second timer based on the angle estimation value and the angle current value;
first output mode switching processing to change the output mode of one pulse signal of the first pulse signal and the second pulse signal to one of a high-level output mode and a low-level output mode based on the signal state value, when it is determined that a timing to change the output mode in the timing determination processing;

interrupt frequency update processing to update the interrupt frequency; and interrupt frequency reset processing to reset the interrupt frequency to the initial value when the interrupt frequency that has been updated is equal to a predetermined first threshold.

2. The signal generation device according to claim 1, wherein the processor is configured or programmed to perform, in the function calculation processing:

intercept calculation processing to calculate an intercept of the absolute angle function by performing delay compensation on a current value of the absolute angle; and slope calculation processing to calculate a slope of the absolute angle function by subtracting a previous value from a current value of the absolute angle.

3. The signal generation device according to claim 1, wherein in the timing determination processing, if an absolute value of a difference value obtained by subtracting the angle current value from the angle estimation value is larger than a predetermined second threshold, the processor is configured or programmed to determine that it is a timing to change the output mode of the second timer.

4. The signal generation device according to claim 1, wherein the third timer is operable to reset the count value when a count value of the number of edges reaches a predetermined timer reset value.

5. The signal generation device according to claim 4, wherein the third timer is operable to compare a count value of the number of edges with a predetermined third threshold, and output, as an origin pulse signal indicating an origin of the absolute angle, a signal that becomes a high level when the count value is smaller than the third threshold.

6. The signal generation device according to claim 1, comprising:

a fourth timer to count a number of edges of the first pulse signal and the second pulse signal output from the second timer; wherein the fourth timer is operable to:
reset the count value when a count value of the number of edges reaches a predetermined timer reset value; and compare a count value of the number of edges with a predetermined fourth threshold, and outputs, as an origin pulse signal indicating an origin of the absolute angle, a signal that becomes a high level when the count value is smaller than the fourth threshold.

7. The signal generation device according to claim 1, wherein if the interrupt frequency is equal to the initial value at the start of the interrupt processing, the processor is configured or programmed to perform as the long-period processing:

the angle acquisition processing;

speed calculation processing to calculate a rotation speed of the rotating body based on a current value and a previous value of the absolute angle;

first operation mode determination processing to determine whether or not an operation mode is a high-speed mode;

lower limit threshold determination processing to determine whether or not the rotation speed is equal to or less than a predetermined lower limit threshold when it is determined that the operation mode is the high-speed mode in the first operation mode determination processing that the operation mode;

first mode switching processing to switch the operation mode from the high-speed mode to a low-speed mode when it is determined that the rotation speed is equal to or less than the lower limit threshold in the lower limit threshold determination processing; and the function calculation processing performed as a first processing of the low-speed mode;

as the short-period processing to be performed after performing the long-period processing or if the interrupt frequency is not equal to the initial value at the start of the interrupt processing, the processor is configured or programmed to perform:

second operation mode determination processing to determine whether or not the operation mode is the low-speed mode;

second processing of the low-speed mode performed when it is determined that the operation mode is the low-speed mode in the second operation mode determination processing; and the interrupt frequency update processing and the interrupt frequency reset processing; and the second processing of the low-speed mode includes the angle estimation value calculation processing, the count value acquisition processing, the angle current value calculation processing, the signal state value calculation processing, the timing determination processing, and the first output mode switching processing.

8. The signal generation device according to claim 1, wherein when the interrupt frequency is equal to the initial value at the start of the interrupt processing, the processor is configured or programmed to perform, as the long-period processing:

the angle acquisition processing;

speed calculation processing to calculate a rotation speed of the rotating body based on a current value and a previous value of the absolute angle;

first operation mode determination processing to determine whether or not an operation mode is a high-speed mode;

upper limit threshold determination processing to determine whether or not the rotation speed is equal to or greater than a predetermined upper limit threshold when it is determined that the operation mode is not the high-speed mode in the first operation mode determination processing; and the function calculation processing performed as a first processing of a low-speed mode when it is determined that the rotation speed is not equal to or greater than the upper limit threshold in the upper limit threshold determination processing;

as the short-period processing to be performed after performing the long-period processing or if the interrupt frequency is not equal to the initial value at the start of the interrupt processing, the processor is configured or programmed to perform:

second operation mode determination processing to determine whether or not the operation mode is the low-speed mode;

second processing of the low-speed mode performed when it is determined that the operation mode is the low-speed mode in the second operation mode determination processing; and the interrupt frequency update processing and the interrupt frequency reset processing; and the second processing of the low-speed mode includes the angle estimation value calculation processing, the count value acquisition processing, the angle current value calculation processing, the signal state value calculation processing, the timing determination processing, and the first output mode switching processing.

9. The signal generation device according to claim 1, wherein when the interrupt frequency is equal to the initial value at the start of the interrupt processing, the processor is configured or programmed to perform, as the long-period processing:
  the angle acquisition processing;
  speed calculation processing to calculate a rotation speed of the rotating body based on a current value and a previous value of the absolute angle;
  first operation mode determination processing to determine whether or not an operation mode is a high-speed mode;
  lower limit threshold determination processing to determine whether or not the rotation speed is equal to or less than a predetermined lower limit threshold when it is determined that the operation mode is the high-speed mode in the first operation mode determination processing; and
  processing of the high-speed mode performed when it is determined that the rotation speed is not equal to or less than the lower limit threshold in the lower limit threshold determination processing; and
as the short-period processing to be performed after performing the long-period processing or if the interrupt frequency is not equal to the initial value at the start of the interrupt processing, the processor is configured or programmed to perform:
  second operation mode determination processing to determine whether or not the operation mode is a low-speed mode; and
  the interrupt frequency update processing and the interrupt frequency reset processing.

10. The signal generation device according to claim 1, wherein when the interrupt frequency is equal to the initial value at the start of the interrupt processing, the processor is configured or programmed to perform, as the long-period processing:
  the angle acquisition processing;
  speed calculation processing to calculate a rotation speed of the rotating body based on a current value and a previous value of the absolute angle;
  first operation mode determination processing to determine whether or not an operation mode is a high-speed mode;
  upper limit threshold determination processing to determine whether or not the rotation speed is equal to or greater than a predetermined upper limit threshold when it is determined that the operation mode is not the high-speed mode in the first operation mode determination processing;
  second mode switching processing to switch the operation mode from a low-speed mode to the high-speed mode when it is determined that the rotation speed is equal to or greater than the upper limit threshold in the upper limit threshold determination processing; and
  processing of the high-speed mode; and
as the short-period processing to be performed after performing the long-period processing or if the interrupt frequency is not equal to the initial value at the start of the interrupt processing, the processor is configured or programmed to perform:
  second operation mode determination processing to determine whether or not the operation mode is the low-speed mode; and
  the interrupt frequency update processing and the interrupt frequency reset processing.

11. The signal generation device according to claim 9, wherein the processor is configured or programmed to perform as processing of the high-speed mode:
  parameter determination processing to determine a timer reset value, a first level inversion threshold, and a second level inversion threshold, which are control parameters of the second timer;
  parameter set processing to set, in the second timer, the timer reset value, the first level inversion threshold, and the second level inversion threshold; and
  second output mode switching processing to switch the output mode of the second timer to a comparison output mode; and
the second timer is operable to:
reset an automatically updated timer count value every time the timer count value reaches the timer reset value;
invert a level of the first pulse signal every time the timer count value reaches the first level inversion threshold; and
invert a level of the second pulse signal every time the timer count value reaches the second level inversion threshold.

* * * * *